(12) United States Patent
Arikawa et al.

(10) Patent No.: US 12,035,295 B2
(45) Date of Patent: Jul. 9, 2024

(54) SCHEDULING APPARATUS, SCHEDULING METHOD AND PROGRAM

(71) Applicant: Nippon Telegraph and Telephone Corporation, Tokyo (JP)

(72) Inventors: Yuki Arikawa, Tokyo (JP); Takeshi Sakamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 436 days.

(21) Appl. No.: 17/612,270

(22) PCT Filed: May 31, 2019

(86) PCT No.: PCT/JP2019/021790
§ 371 (c)(1),
(2) Date: Nov. 18, 2021

(87) PCT Pub. No.: WO2020/240842
PCT Pub. Date: Dec. 3, 2020

(65) Prior Publication Data
US 2022/0248416 A1 Aug. 4, 2022

(51) Int. Cl.
*H04W 72/12* (2023.01)
*H04L 5/00* (2006.01)

(52) U.S. Cl.
CPC ........... *H04W 72/12* (2013.01); *H04L 5/0035* (2013.01)

(58) Field of Classification Search
CPC ............................. H04W 72/12; H04L 5/0035
See application file for complete search history.

(56) References Cited

FOREIGN PATENT DOCUMENTS

| CN | 100385843 C | * 4/2008 | ............... H04L 1/06 |
| JP | 2017216550 A | * 12/2017 | |
| JP | 2017216550 A | 12/2017 | |

(Continued)

OTHER PUBLICATIONS

Taoka et al., "MIMO and Inter-Cell Cooperative Transmission and Reception Technology in LTE-Advanced," NTT DOCOMO Technical Journal, vol. 18, No. 2, 2010, pp. 22-30.

(Continued)

*Primary Examiner* — Saad A. Waqas
(74) *Attorney, Agent, or Firm* — Slater Matsil, LLP

(57) ABSTRACT

A scheduling apparatus includes: a division control device configured to divide an entire communicable area into a plurality of areas; a combination generation device (12-1 to 12-N) configured to generate candidate patterns of combinations of transmission points and user terminals for each area; a combination evaluation device (13-1 to 13-N) configured to calculate evaluation values of candidate patterns for each area; an optimal combination holding device (15-1 to 15-N) configured to hold an optimal combination pattern among candidate patterns for each area; a calculation result sharing device configured to output an evaluation value of an optimal combination pattern to the combination evaluation device (13-1 to 13-N) for sharing with the areas as shared information; and an overall transmission weight matrix calculation device configured to calculate a transmission weight matrix for an entire communicable area based on a result obtained by combining optimal combination patterns of the areas.

6 Claims, 15 Drawing Sheets

(56) References Cited

FOREIGN PATENT DOCUMENTS

JP          2018085682 A      5/2018
WO      WO-2009049032 A1 *   4/2009   ............ H04W 36/08

OTHER PUBLICATIONS

Arikawa, et al., "Hardware accelerator for coordinated radio-resource scheduling in 5G ultra-high-density distributed antenna systems," 2017 27th International Telecommunication Networks and Applications Conference (ITNAC), Nov. 2017, 6 pages.

* cited by examiner

SCHEDULING APPARATUS, SCHEDULING METHOD AND PROGRAM

CROSS-REFERENCE TO RELATED APPLICATIONS

This application is a national phase entry of PCT Application No. PCT/JP2019/021790, filed on May 31, 2019, which application is hereby incorporated herein by reference.

TECHNICAL FIELD

The present invention relates to a scheduling apparatus, a scheduling method, and a program for assigning radio resources included in a wireless network system having a plurality of transmission points to wireless communications between the transmission points and a user terminal.

BACKGROUND

With the widespread use of smartphones, there is an increasing social demand for a wireless network such as an increased communication speed, an increased usage bandwidth, and the like. In view of such a circumstance, wireless network systems to which wireless interface specifications of a mobile communication system called Long Term Evolution (LTE) are applied are more often used. The LTE adopts, as one of radio access technologies, Coordinated Multi-point transmission/reception (hereinafter abbreviated as CoMP) in which a plurality of base stations (transmission points, hereinafter abbreviated as TPs) transmit and receive a signal to and from mobile terminals (user terminals, hereinafter abbreviated as UEs) in a coordinated manner (see Non Patent Literature 1).

The CoMP technology is one of important technologies for improving a frequency utilization efficiency and a cell edge user throughput. For example, in downlink communication (transmission from a TP to a UE), when a plurality of TPs simultaneously use the same frequency band to perform transmission to UEs, it is possible to increase a utilization efficiency of a radio resource. However, when the plurality of TPs perform transmission to different UEs, for a UE capable of receiving signals from a plurality of TPs, a signal from another TP may interfere with a desired reception signal and as a result, the throughput may be possibly reduced. Thus, the CoMP is an essential technology for improving the communication speed while suppressing such interference.

Further, research and development on a next-generation mobile communication system evolved from the LTE is pursued, and in a concept expanded from the CoMP, a coordinated radio resource management scheme and a dedicated circuit configuration for increasing a processing speed of such a scheme have been proposed (see Non Patent Literature 2). Similarly, Patent Literature 1 discloses a circuit arrangement for parallel processing of matrix calculation in order to increase a processing speed of the coordinated radio resource management scheme.

FIG. 15 is a block diagram illustrating a configuration of a scheduling apparatus in the related art disclosed in Patent Literature 1. A channel information holding unit 101 of a scheduling apparatus 100 stores channel information representing radio wave states between TPs and UEs. A combination generation unit 102 generates candidate patterns of combinations of TPs and UEs. A combination evaluation unit 103 calculates, based on the channel information, evaluation values of the candidate patterns of combinations of TPs and UEs. An optimal combination holding unit 104 holds a pattern having the highest evaluation value among the candidate patterns as an optimal combination pattern for assigning a radio resource.

Unfortunately, in the technologies disclosed in Non Patent Literature 2 and Patent Literature 1, an area to which the coordinated radio resource management scheme can be applied is limited by the number of TPs covered by the scheduling apparatus, and thus application of the coordinated radio resource management scheme across a plurality of areas has been difficult.

On the other hand, according to Patent Literature 2, there is disclosed a technology in which TPs covered by a scheduling apparatus are divided into a plurality of areas, calculation of evaluation values and identification of an optimal combination of TPs and UEs for each of the divided areas are performed, and finally optimal combinations identified for the divided areas are combined to form an overall optimal combination pattern. However, Patent Literature 2 does not disclose a technology in which control is performed between the areas in a coordinated manner, that is, it does not disclose a technology in which radio wave interference between the divided areas is added to consideration of calculation for identification of an optimal combination between TPs and UEs, thereby suppressing radio wave interference between the areas.

TPs are arranged in a planar manner in a wireless network system and thus more TPs are collectively controlled using a coordinated radio resource management scheme, so that radio wave interference between the TPs is reduced to allow for an improved wireless throughput in the entire system. However, when the number of coordinated TPs increases, a matrix size and the like handled in the coordinated radio resource management scheme become larger and the number of candidate combination patterns of TPs and UEs also increases. As a result, a processing time required for identification of the optimal combination pattern increases, making it difficult to complete processing for the coordinated radio resource management scheme within a scheduling cycle determined by the wireless network system (e.g., a minimum of 1 millisecond in the case of LTE). When only the technologies disclosed in Patent Literature 1, Patent Literature 2, and Non Patent Literature 2 are used, it is difficult to identify the optimal combination pattern in consideration of radio wave interference from a TP outside of the coordinated range and as a result, it is impossible to increase the number of coordinated TPs.

CITATION LIST

Patent Literature

Patent Literature 1: JP 2018-085682 A
Patent Literature 2: JP 2017-216550 A

Non Patent Literature

Non Patent Literature 1: Taoka, et al., "MIMO and Inter-cell Coordinated Transmission and Reception Technology in LTE-Advanced", NTT DOCOMO Technical Journal, Vol. 18, No. 2, pp. 22-30, July 2010, <https://www.nttdocomo.co.jp/binary/pdf/corporate/technology/rd/technical_journal/bn/vol18_2/vol18_2_022jp.pdf>

Non Patent Literature 2: Y. Arikawa, T. Sakamoto and S. Kimura, "Hardware Accelerator for Coordinated Radio-resource Scheduling in 5G Ultra-high-density Distributed Antenna Systems", 2017 27th International Telecommunication Networks and Applications Conference (ITNAC), Melbourne, pp. 1-6, November 2017.

SUMMARY OF THE INVENTION

Technical Problem

In order to solve the above-described problems, an object of embodiments of the present invention is to provide a scheduling apparatus, a scheduling method, and a program which enable an increase in the number of transmission points performing coordinated control in processing of a coordinated radio resource management scheme in a wireless network system.

Means for Solving the Problem

A scheduling apparatus according to embodiments of the present invention includes: a division control unit configured to divide an entire communicable area covered by a plurality of transmission points into a plurality of areas; a combination generation unit configured to generate candidate patterns of combinations of transmission points of the plurality of transmission points and user terminals for each of the divided areas; a combination evaluation unit configured to calculate evaluation values of the candidate patterns for each of the divided areas based on channel information representing radio wave states between the transmission points and the user terminals; an optimal combination holding unit configured to hold a pattern having the highest evaluation value among the candidate patterns as an optimal combination pattern in assigning a radio resource, for each of the divided areas; a calculation result sharing unit configured to output an evaluation value of an optimal combination pattern held for each of the divided areas by the optimal combination holding unit to the combination evaluation unit for sharing with the divided areas as first shared information when a predetermined first timing comes; and an overall transmission weight matrix calculation unit configured to calculate a transmission weight matrix for the entire communicable area based on a result obtained by combining the optimal combination patterns of the divided areas when a predetermined second timing after the first timing comes, wherein after the first timing, the combination evaluation unit uses the first shared information along with the channel information to calculate an evaluation value of the candidate pattern for each of the divided areas.

Further, in one configuration example of the scheduling apparatus according to embodiments of the present invention, the combination evaluation unit includes: a transmission weight matrix calculation unit configured to calculate a transmission weight matrix for each of the divided areas based on the channel information; an evaluation value calculation unit configured to calculate an evaluation value of the candidate pattern for each of the candidate patterns and for each of the divided areas based on the transmission weight matrix calculated by the transmission weight matrix calculation unit; and an overall evaluation value calculation unit configured to calculate a sum of evaluation values calculated by the evaluation value calculation unit for each of the divided areas, the calculation result sharing unit outputs a transmission weight matrix calculated by the transmission weight matrix calculation unit of the combination evaluation unit along with an evaluation value of an optimal combination pattern held by the optimal combination holding unit to the combination evaluation unit for sharing with the divided areas as the first shared information when the first timing comes, and the transmission weight matrix calculation unit of the combination evaluation unit uses the first shared information along with the channel information to calculate the transmission weight matrix after the first timing.

Further, in one configuration example of the scheduling apparatus according to embodiments of the present invention, the calculation result sharing unit outputs the first shared information to the combination evaluation unit at a time, as the first timing, when the number of combinations of transmission points and a user terminal for which calculation of the evaluation values for each of the divided areas has been completed reached a predetermined number.

Further, in one configuration example of the scheduling apparatus according to embodiments of the present invention, the calculation result sharing unit transmits an evaluation value of an optimal combination pattern held by the optimal combination holding unit as second shared information to another scheduling apparatus covering a communicable area different from a communicable area covered by the scheduling apparatus when a predetermined third timing after the second timing comes, and transmits a result obtained by combining the optimal combination patterns of the divided areas as third shared information to the other scheduling apparatus when a predetermined fourth timing after the third timing comes, after the third timing, the combination evaluation unit uses the first shared information and the second shared information along with the channel information to calculate an evaluation value of the candidate pattern for each of the divided areas, and the overall transmission weight matrix calculation unit calculates a transmission weight matrix of an entire area having a communicable area covered by the scheduling apparatus and a communicable area covered by the other scheduling apparatus in combination based on a result obtained by combining an optimal combination pattern held by the optimal combination holding unit and an optimal combination pattern obtained by the third shared information transmitted from the other scheduling apparatus.

A scheduling apparatus according to embodiments of the present invention includes: a combination generation unit configured to generate candidate patterns of combinations of transmission points and user terminals; a combination evaluation unit configured to calculate evaluation values of the candidate patterns based on channel information representing radio wave states between the transmission points and the user terminals; an optimal combination holding unit configured to hold a pattern having the highest evaluation value among the candidate patterns as an optimal combination pattern in assigning a radio resource; a calculation result sharing unit configured to transmit an evaluation value of an optimal combination pattern held by the optimal combination holding unit to another scheduling apparatus covering a communicable area different from a communicable area covered by the scheduling apparatus for sharing with the other scheduling apparatus as first shared information when a predetermined first timing comes and transmit an optimal combination pattern held by the optimal combination holding unit as second shared information to the other scheduling apparatus when a predetermined second timing after the first timing comes; and an overall transmission weight matrix calculation unit configured to calculate a transmission weight matrix of an entire area having a communicable area covered by the scheduling apparatus and a communicable area covered by the other scheduling apparatus in combination based on a result obtained by combining an optimal combination pattern held by the optimal combination holding unit and an optimal combination pattern obtained by the second shared information transmitted by the other scheduling apparatus, wherein after the first timing, the combination evaluation unit uses the shared information along with the channel information to calculate an evaluation value of the candidate pattern.

A scheduling method according to embodiments of the present invention includes: dividing an entire communicable area covered by a plurality of transmission points into a plurality of areas; generating candidate patterns of combinations of transmission points of the plurality of transmission points and user terminals for each of the divided areas; calculating evaluation values of the candidate patterns for each of the divided areas based on channel information representing radio wave states between the transmission points and the user terminals; holding a pattern having the highest evaluation value as an optimal combination pattern in assigning a radio resource among the candidate patterns for each of the divided areas; outputting evaluation values of optimal combination patterns held for the divided areas in the holding for sharing with the divided areas as shared information when a predetermined first timing comes; and calculating a transmission weight matrix of an entire area including the plurality of transmission points based on a result of combining the optimal combination patterns of the divided areas when a predetermined second timing after the first timing comes, wherein after the first timing, in the calculating of the evaluation values of the candidate patterns, the shared information is used along with the channel information to calculate an evaluation value of the candidate pattern for each of the divided areas.

Further, a scheduling program according to embodiments of the present invention causes a computer to execute: dividing an entire communicable area covered by a plurality of transmission points into a plurality of areas; generating candidate patterns of combinations of transmission points of the plurality of transmission points and user terminals for each of the divided areas; calculating evaluation values of the candidate patterns based on channel information representing radio wave states between the transmission points and the user terminals for each of the divided areas; holding a pattern having the highest evaluation value among the candidate patterns as an optimal combination pattern in assigning a radio resource for each of the divided areas; outputting evaluation values of optimal combination patterns held for the divided areas in the holding for sharing with the divided areas as shared information when a predetermined first timing comes; and calculating a transmission weight matrix of an entire area including the plurality of transmission points based on a result obtained by combining the optimal combination patterns of the divided areas when a predetermined second timing after the first timing comes, wherein after the first timing, in the calculating of the evaluation values of the candidate patterns, the shared information is used along with the channel information to calculate an evaluation value of the candidate pattern for each of the divided areas.

Effects of Embodiments of the Invention

According to embodiments of the present invention, all transmission points covered by the scheduling apparatus are divided into a plurality of areas, and candidate patterns of combinations of transmission points and user terminals are generated for each of the divided areas, evaluation values of the candidate patterns are calculated for each of the divided areas to determine an optimal combination pattern for each of the divided areas, and evaluation values of the optimal combination patterns for the divided areas are shared with the divided areas. Then, the optimal combination patterns of the divided areas are combined to calculate a transmission weight matrix of the entire area covered by the scheduling apparatus. As a result, in embodiments of the present invention, scheduling in which a plurality of areas are caused to collaborate with each other can be processed, so that it is possible to extend a coordinated range in which wireless transmission is performed between transmission points in a coordinated manner compared to the related-art scheduling apparatus. In addition, in embodiments of the present invention, the coordinated range can be extended and thus, it is possible to reduce the effects of radio wave interference at an area boundary, so that improvement in wireless throughput can be expected.

DETAILED DESCRIPTION OF ILLUSTRATIVE EMBODIMENTS

Embodiments of the present invention will be hereinafter described with reference to the drawings.

Configuration of First Embodiment

Figure 1:
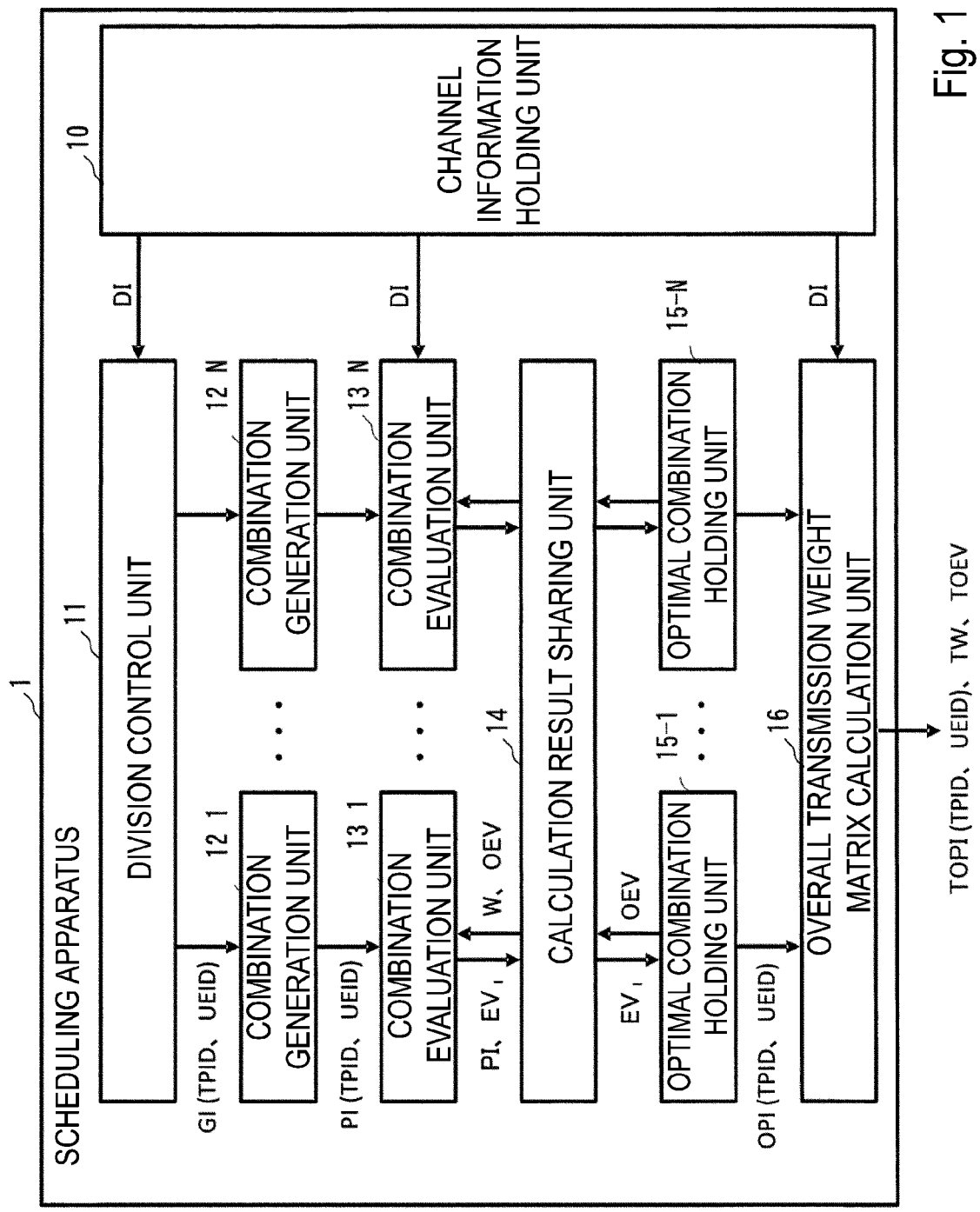
FIG. 1 is a block diagram illustrating a configuration of a scheduling apparatus according to a first embodiment of the present invention.

A configuration of a scheduling apparatus according to a first embodiment of the present invention will be first described with reference to FIGS. 1 to 5. FIG. 1 is a block diagram illustrating the configuration of the scheduling apparatus according to the first embodiment. For a wireless network having a plurality of TPs, a scheduling apparatus 1 searches for an optimal combination pattern used in assigning a radio resource for wireless communication between the TPs and UEs from among combination patterns of TPs and transmission states (transmission stop or UEs) of the TPs (combinations of TPs and UEs).

The scheduling apparatus 1 calculates evaluation values of combination patterns that are candidates for connection between TPs and UEs in order to determine a UE to which data of each TP is to be transmitted. The scheduling apparatus 1 repeats the trial to calculate evaluation values within a scheduling time, and sets an optimal combination pattern to a combination pattern that is to be actually used for transmission, the optimal combination pattern having the maximum evaluation value at the time point when the scheduling time has elapsed. Note that the scheduling time is a time that can be spent in processing to identify a combination pattern of a TP and a UE and is determined by a system. For example, for LTE, the scheduling time is a minimum of 1 millisecond and a combination pattern of a TP and a UE is identified in one millisecond cycle.

The scheduling apparatus 1 of the present embodiment includes a channel information holding unit 10, a division control unit 11, a plurality of combination generation units 12-1 to 12-N (where N is an integer of two or more), a plurality of combination evaluation units 13-1 to 13-N, a plurality of optimal combination holding units 15-1 to 15-N, a calculation result sharing unit 14, and an overall transmission weight matrix calculation unit 16. The channel information holding unit 10 stores channel information DI representing radio wave states between TPs and UEs acquired from the TPs. The division control unit 11 divides an entire communicable area covered by TPs at which the scheduling apparatus 1 targets into a plurality of areas using the channel information DI read from the channel information holding unit 10. Each of the plurality of combination generation units 12-1 to 12-N (where N is an integer of 2 or more) is provided in each of the divided areas, and generates candidate patterns of combinations of TPs and UEs for each of the divided areas. Each of the plurality of combination evaluation units 13-1 to 13-N is provided in each of the divided areas, and calculates evaluation values of candidate patterns of combinations of TPs and UEs for each of the divided areas. Each of the plurality of optimal combination holding units 15-1 to 15-N is provided in each of the divided areas, and holds a pattern having the highest evaluation value among the candidate patterns as an optimal combination pattern in assigning a radio resource for each of the divided areas. When a predetermined first timing comes, the calculation result sharing unit 14 outputs evaluation values of the optimal combination patterns held by the optimal combination holding units 15-1 to 15-N to the combination evaluation units 13-1 to 13-N so as to share the evaluation values as shared information in the divided areas. The overall transmission weight matrix calculation unit 16 calculates a transmission weight matrix of the entire communicable area based on a result obtained by combining the optimal combination patterns of the divided areas when a predetermined second timing after the first timing comes.

Note that, for example, as described in a literature "Hou et al., 'Channel Estimation by Extended Two-Dimensional DFT Interpolation Supporting High Speed Mobile Environment', NTT DOCOMO Technical Journal, Vol. 16, No. 4, pp. 20-26, January, 2009, <https://www.nttdocomo.co.jp/binary/pdf/corporate/technology/rd/technical_journal/bn/vol16_4/vol16_4_020jp.pdf>", in order to acquire channel information DI, a pattern signal defined in advance between a TP and a UE is used to transmit the pattern signal from the UE to the TP. The TP can acquire the channel information DI by estimating a channel (attenuation amount and phase rotation amount) from the received pattern signal.

The division control unit 11 divides an entire communicable area covered by TPs at which the scheduling apparatus 1 targets into a plurality of areas using the channel information DI read from the channel information holding unit 10. Specifically, the division control unit 11 groups combinations of TPs and UEs having strong correlation based on the channel information DI. Then, the division control unit 11 outputs combination generation condition information GI (TPID, UEID) including identification information (TPID) of TPs and identification information of UEs (UEID) assigned to the divided areas to the corresponding combination generation units 12-1 to 12-N for each area.

The maximum number of divisions of the area is the number of the combination evaluation units 13-1 to 32-N included in the scheduling apparatus 1, that is, N (N is an integer of two or more). Moreover, the maximum number of a sum of the number of TPs that can be assigned to each area and the number of surrounding TPs used in calculating an evaluation value is up to the size of a transmission weight matrix that can be calculated in each of the combination evaluation units 13-1 to 13-N. When the number of TPs that can be assigned to each area is equal to the size of the transmission weight matrix that can be calculated in each of the combination evaluation units 13-1 to 13-N, the number of surrounding TPs outside the area becomes zero, so that calculation results of other areas cannot be taken into account. The evaluation values of surrounding TPs outside the area are obtained by first shared information described later.

Note that although in the example described above, an example is given in which the area is divided based on the channel information DI between TPs and UEs, the method of area division may be another method.

For example, the division control unit 11 may perform area division based on positional information of TPs, such that positional information of TP2s is acquired and a TP2 whose distance from an arbitrarily selected TP2 is included in a predetermined range is made to belong to the same area as the selected TP2. At this time, the division control unit 11 only needs to select a UE whose distance from one TP belonging to one area is within a predetermined range as a UE belonging to the area.

Figure 2:
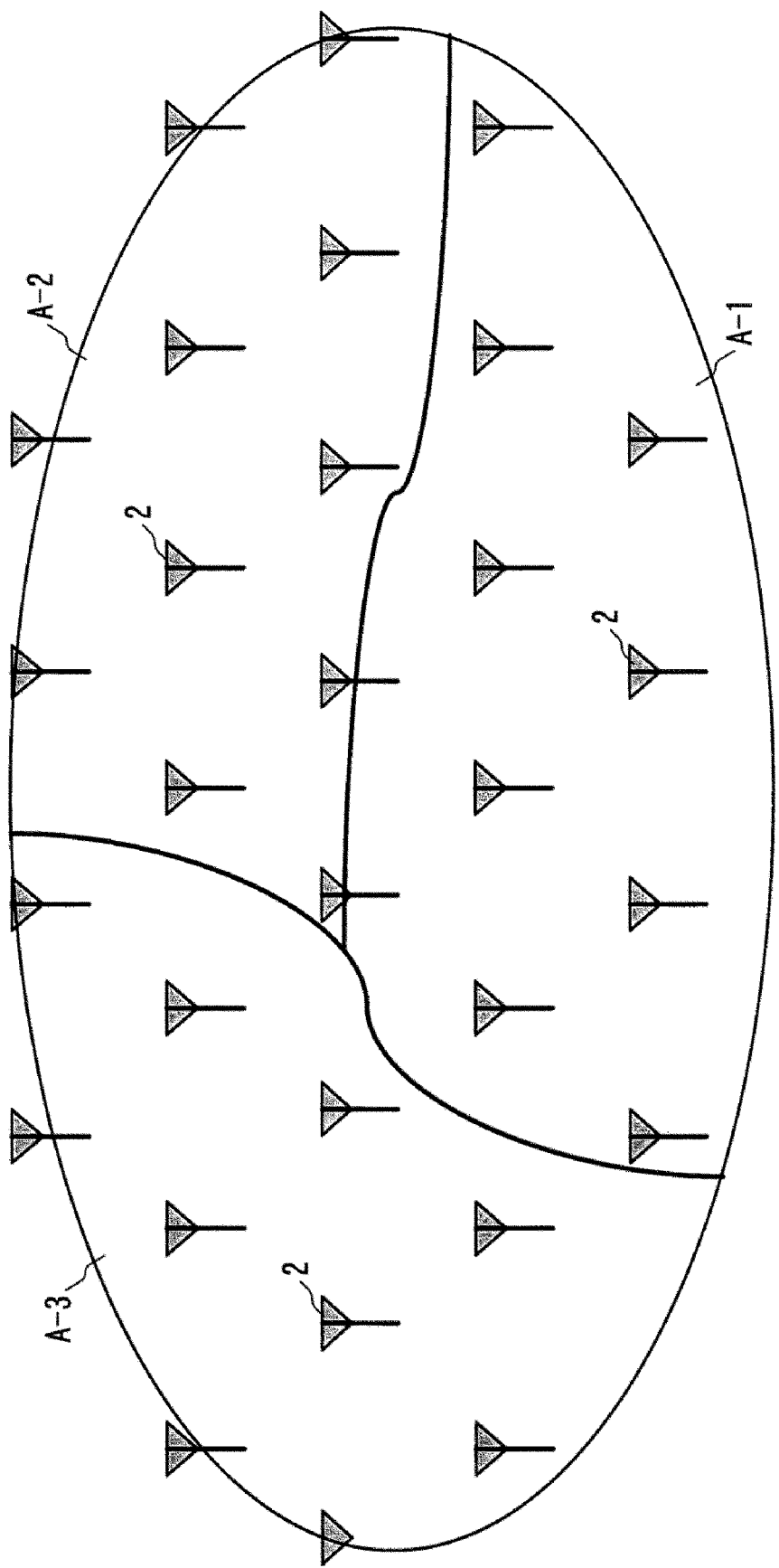
FIG. 2 is a diagram for explaining a method of area division according to the first embodiment of the present invention.

In an example of FIG. 2, in an area A-1, the combination generation unit 12-1, the combination evaluation unit 13-1, and the optimal combination holding unit 15-1 determine the optimal combination pattern of TPs and UEs. In an area A-2, the combination generation unit 12-2, the combination evaluation unit 13-2, and the optimal combination holding unit 15-2 determine the optimal combination pattern of TPs and UEs. In an area A-3, the combination generation unit 12-3, the combination evaluation unit 13-3, and the optimal combination holding unit 15-3 determine the optimal combination pattern of TPs and UEs.

Alternatively, the division control unit 11 may perform area division based on positional information of UEs, such that positional information of UEs is acquired and a plurality of TPs whose distances from an arbitrarily selected UE are included in a predetermined range are made to belong to an identical area. At this time, the division control unit 11 only needs to select a UE whose distance from one TP belonging to one area is within a predetermined range as another UE belonging to the area.

Alternatively, the division control unit 11 may use an area division method disclosed in Patent Literature 2.

Each of the combination generation units 12-1 to 12-N generates candidate patterns of combinations of TPs and UEs in accordance with a predetermined search algorithm within a range of combinations of TPs and UEs indicated by the combination generation condition information GI (TPID, UEID) for the corresponding area. For example, each of the combination generation units 12-1 to 12-N generates candidate patterns of combinations by a commonly known approximate solution of a combinatorial optimization problem (e.g., hill climbing, greedy algorithm, and the like). Candidate patterns are generated for each TP belonging to the corresponding area. Then, each of the combination generation units 12-1 to 12-N outputs combination candidate pattern information PI (TPID, UEID) to a corresponding one of the combination evaluation units 13-1 to 13-N.

Note that although in the example described above, an example is given in which the commonly known approximate solution of the combinational optimization problem is used, the combination generation method may be another method.

For example, as disclosed in JP 2017-216549 A, a combination of TPID and UEID that is a connection candidate may be stored and when reading the combination of TPID and UEID based on a set read range, a reference combination prepared in advance may be used to generate any combination.

Figure 3:
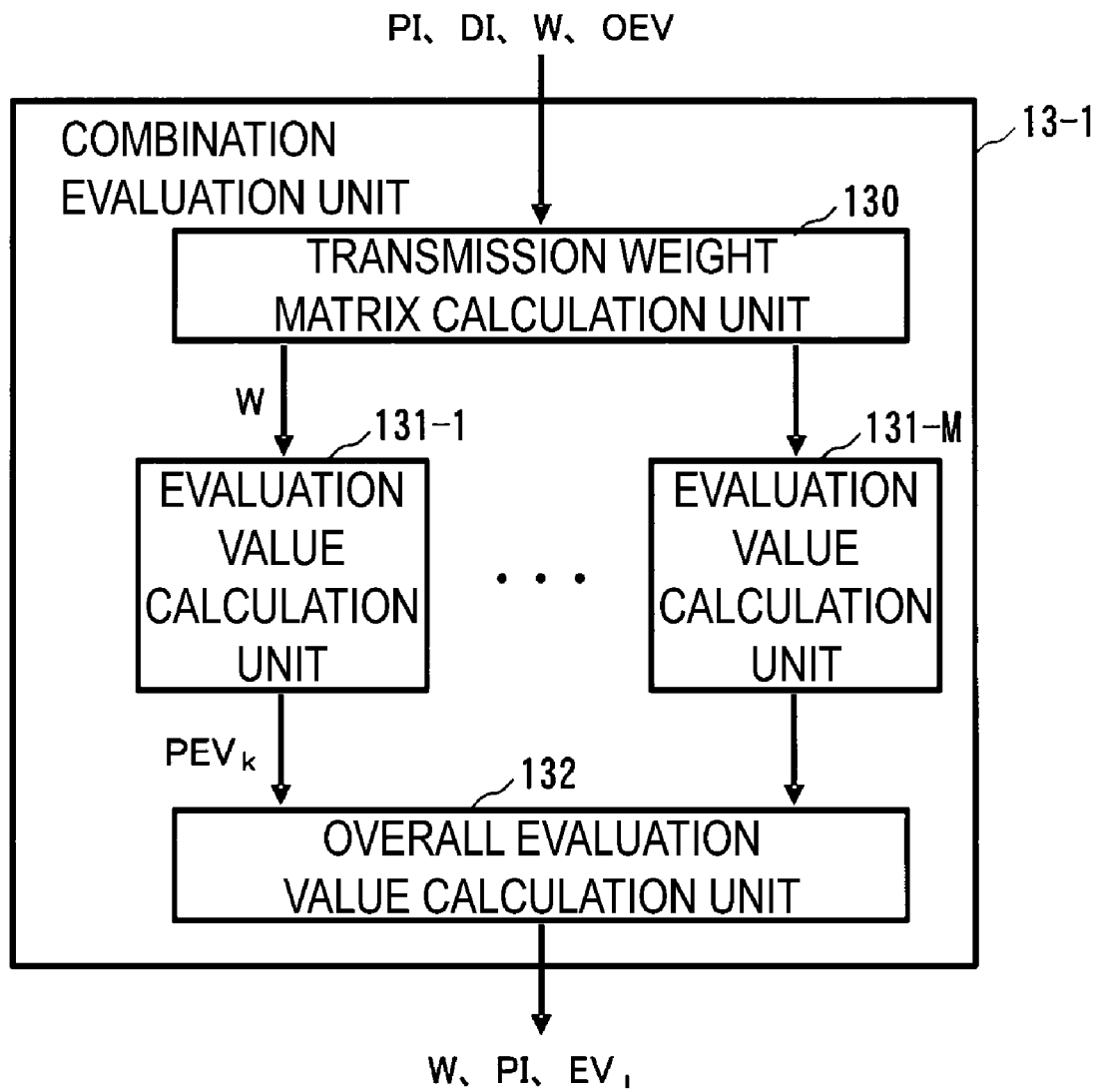
FIG. 3 is a block diagram illustrating a configuration of a combination evaluation unit of the scheduling apparatus according to the first embodiment of the present invention.

As illustrated in FIG. 3, the combination evaluation unit 13-1 includes a transmission weight matrix calculation unit 13o, evaluation value calculation units 131-1 to 131-M, and an overall evaluation value calculation unit 132. The transmission weight matrix calculation unit 130 calculates a transmission weight matrix W for a TP belonging to the corresponding area or a transmission weight matrix W for a TP belonging to the corresponding area and a TP outside the corresponding area, based on candidate pattern information PI output from the corresponding combination generation unit 12-1, the channel information DI acquired from the channel information holding unit 10 and the first shared information described later. Each of the evaluation value calculation units 131-1 to 131-M calculates, based on the transmission weight matrix W, an evaluation value such as a wireless throughput and a proportional fairness (PF) metric value of a TP belonging to the corresponding area, as an evaluation value $PEV_k$ of a candidate pattern including the TP (k is an integer from 1 to M, and M is an integer of 2 or more). The overall evaluation value calculation unit 132 calculates a sum of evaluation values $PEV_k$ calculated by the evaluation value calculation units 131-1 to 131-M as an evaluation value $EV_i$ (where i is an integer from 1 to N) of candidate patterns of combinations of TPs and UEs for the corresponding area. The configuration of the other combination evaluation units 13-2 to 13-N is the same as that of the combination evaluation unit 13-1.

The PF metric value is a value obtained by dividing the throughput value of the TP of the candidate pattern by an average throughput value cumulated for a predetermined period of time.

Note that the combination evaluation units 13-1 to 13-N each calculate evaluation values $PEV_k$ for up to M TPs belonging to the corresponding area using the evaluation value calculation units 131-1 to 131-M. If the number of TPs included in the corresponding area is less than M, a part of the evaluation value calculation units 131-1 to 131-M is used.

In a stage where the first shared information described later has not been obtained, the transmission weight matrix calculation unit 130 calculates the transmission weight matrix W having up to M rows and M columns for up to M TPs belonging to the corresponding area, based on the candidate pattern information PI output from the corresponding combination generation unit 12-1 and the channel information DI acquired from the channel information holding unit 10. If the number of TPs belonging to the corresponding area is less than M, the matrix size is reduced to perform calculation by, for example, calculating the transmission weight matrix W using some circuits of the transmission weight matrix calculation unit 130 or setting the value of the matrix element in which there is no corresponding TP to zero.

On the other hand, after the first shared information has been obtained, the transmission weight matrix calculation unit 130 calculates the transmission weight matrix W using the candidate pattern information PI, the channel information DI, and the first shared information. The first shared information includes transmission weight matrices W for the respective areas and evaluation values OEV of optimal combination patterns of the respective areas. As described later, the first shared information is output from the calculation result sharing unit 14. Then, the transmission weight matrix calculation unit 130 calculates, based on the candidate pattern information PI, the channel information DI, and the transmission weight matrix W for an area adjacent to the corresponding area and the evaluation values OEV for the surrounding TPs not included in the corresponding area of the first shared information, the transmission weight matrix W having up to (M+L) rows and (M+L) columns for up to M TPs belonging to the corresponding area and up to surrounding L TPs not included in the corresponding area.

If the number of TPs belonging to the corresponding area is less than M or the number of surrounding TPs is less than L, the matrix size is reduced to perform calculation by, for example, calculating the transmission weight matrix W using some circuits of the transmission weight matrix calculation unit 130 or setting the value of the matrix element in which there is no corresponding TP to zero.

Each of the optimal combination holding units 15-1 to 15-N performs processing of setting a candidate pattern of a combination of a TP and a UE in which the evaluation value $EV_i$ calculated by a corresponding one of the combination evaluation units 13-1 to 13-N is maximized to the optimal combination pattern for each area (for each combination evaluation unit). Then, each of the optimal combination holding units 15-1 to 15-N holds the optimal combination pattern information OPI (TPID, UEID) including TPID and UEID of the optimal combination pattern and the evaluation value $OEV_i$ for the optimal combination pattern.

Figure 4:
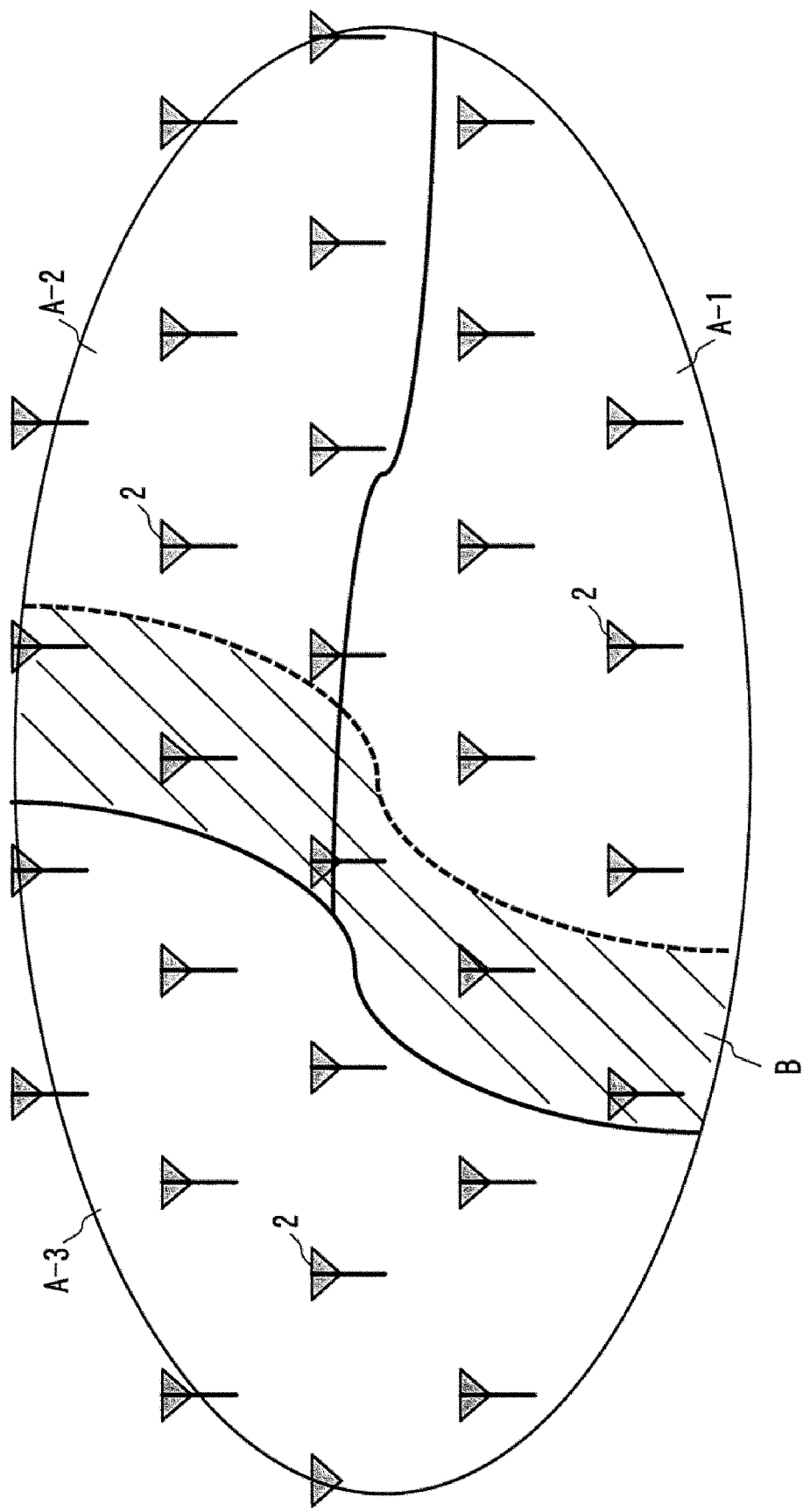
FIG. 4 is a diagram for explaining an operation of utilizing calculation results for surrounding areas for calculation of an evaluation value for an area in the first embodiment of the present invention.

FIG. 4 illustrates an example of extending the TP, which is a calculation target, in the calculation of the evaluation value OEV in the area A-3. In the example of FIG. 4, when calculating the transmission weight matrix W and the evaluation value OEV for the area A-3, the transmission weight matrices W for the adjacent areas A-1 and A-2, and the evaluation values OEV for TPs included in a region B around the area A-3 of TPs belonging to the adjacent areas A-1 and A-2 are used.

The calculation result sharing unit 14 determines whether or not to temporarily hold calculation results such as the transmission weight matrices W calculated by the combination evaluation units 13-1 to 13-N and the evaluation values $OEV_i$ of the optimal combination patterns obtained by the optimal combination holding units 15-1 to 15-N and when holding, stores the calculation results in a storage device such as a memory or a register and output the calculation results to the combination evaluation units 13-1 to 13-N.

In the calculation result sharing unit 14, for the determination condition for determining whether or not to temporarily hold the transmission weight matrices W and the evaluation values $OEV_i$ of the optimal combination patterns, it is used whether or not the number of combinations of TPs and UEs for which calculation of the evaluation value EV has been completed has reached a predetermined number. Specifically, the calculation result sharing unit 14 counts the number of combinations of TPs and UEs for which the calculation of the evaluation value EV has been completed in each of the combination evaluation units 13-1 to 13-N, for each area (for each combination evaluation unit).

The calculation result sharing unit 14 holds calculation results for areas in which the number of combinations for which calculation of the evaluation value EV has been completed has reached a predetermined number, and outputs the held calculation results to the combination evaluation units 13-1 to 13-N when the number of combinations for which the calculation of the evaluation value EV has been completed reaches a predetermined number in all the areas. The predetermined number can be set from the outside of the scheduling apparatus 1. Furthermore, after clearing the value of counts at the time when the number of counts reaches a predetermined number, the calculation result sharing unit 14 starts again to count the number of combinations for which the calculation has been completed.

In order to share calculation results of evaluation values EV in a plurality of areas, at the time of sharing the calculation results, it is necessary to hold the on-going status of searching for a combination such as an optimal combination pattern and an evaluation value of the optimal combination pattern in each area. As in the present embodiment, allowing calculation results to be held in a predetermined cycle makes it unnecessary to hold the calculation results for all candidate patterns, which can reduce a memory amount.

Figure 5:
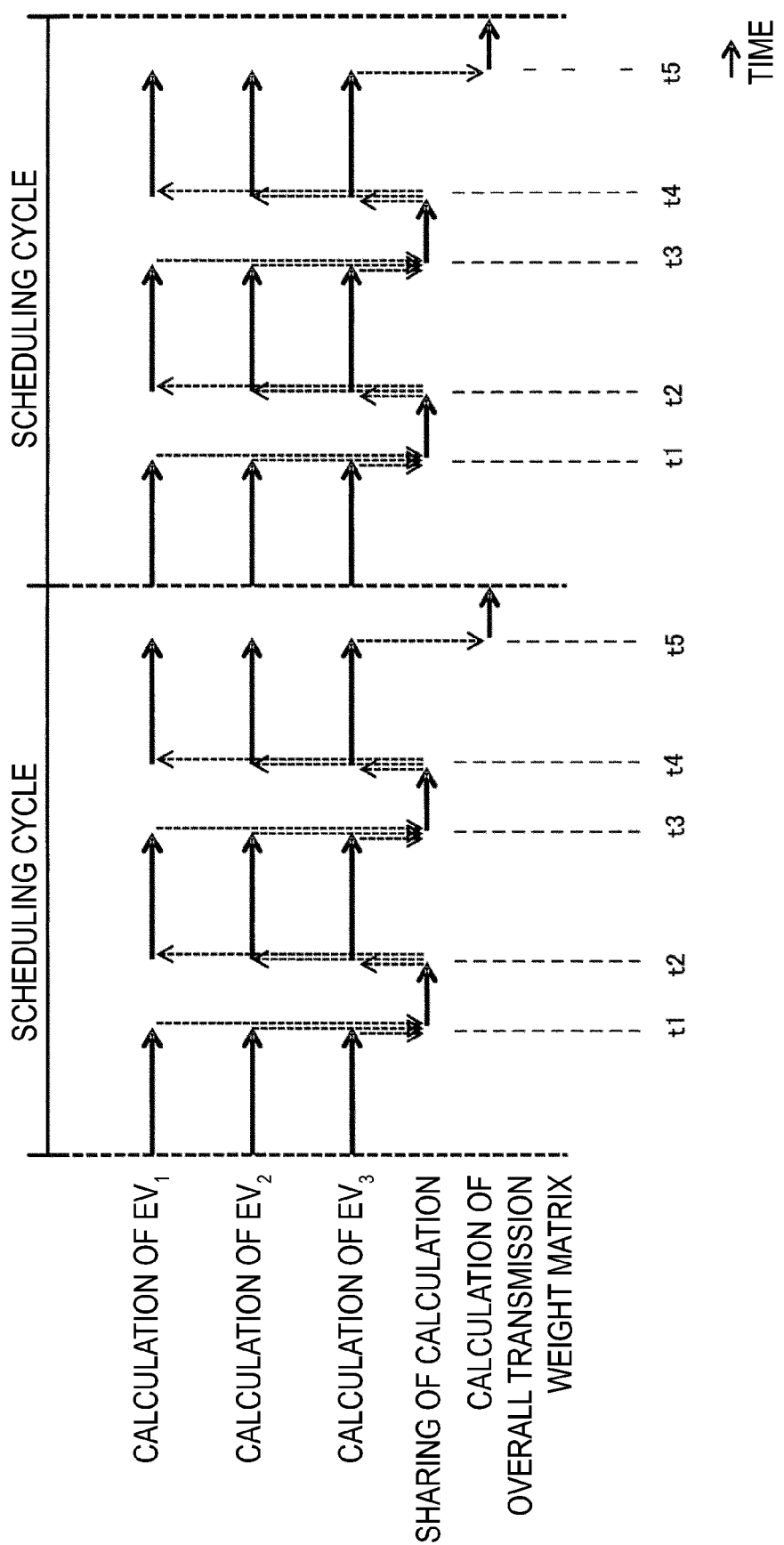
FIG. 5 is a timing chart for explaining a timing of sharing calculation results in the scheduling apparatus according to the first embodiment of the present invention.

FIG. 5 is a timing chart for explaining a timing of sharing the calculation results in the present embodiment. In an example of FIG. 5, from the time point when the scheduling cycle is started, the combination evaluation units 13-1 to 13-3 calculate the evaluation values $EV_1$ to $EV_3$ for the areas A-1 to A-3, respectively, without utilizing the first shared information.

The calculation result sharing unit 14 holds the calculation results of the transmission weight matrix W obtained by the combination evaluation units 13-1 to 13-3 and the evaluation values $OEV_1$ to $OEV_3$ of the optimal combination patterns obtained by the optimal combination holding units 15-1 to 15-3 at a time point of time t1 (first timing) at which the number of combinations of TPs and UEs for which calculation of the evaluation values $EV_1$ to $EV_3$ has been completed reaches a predetermined number, and outputs the held calculation results to the combination evaluation units 13-1 to 13-3. Thus, sharing of the calculation results of the transmission weight matrix W for the areas A-1 to A-3 and the evaluation values $OEV_1$ to $OEV_3$ is completed at time t2.

After the sharing of the calculation results has been completed, the combination evaluation units 13-1 to 13-3 use the first shared information (the transmission weight matrix W and the evaluation values $OEV_1$ to $OEV_3$) obtained by the sharing of the calculation results to calculate the evaluation values $EV_1$ to $EV_3$ for the areas A-1 to A-3, respectively. The calculation result sharing unit 14 holds calculation results of the transmission weight matrix W obtained by the combination evaluation units 13-1 to 13-3 and the evaluation values $OEV_1$ to $OEV_3$ of the optimal combination patterns obtained by the optimal combination holding units 15-1 to 15-3 at a time point of time $t_3$ at which the number of combinations of TPs and UEs for which calculation of the evaluation values $EV_1$ to $EV_3$ has been completed reaches a predetermined number, and outputs the held calculation results to the combination evaluation units 13-1 to 13-3. Thus, sharing of the calculation results of the transmission weight matrix W and the evaluation values $OEV_1$ to $OEV_3$ for the areas A-1 to A-3 is completed at time $t_4$. In the case of the example of FIG. 5, calculation of the evaluation values using shared information is performed only twice in one scheduling cycle.

Note that in the above example, the transmission weight matrix W is held at a timing when the number of combinations of TPs and UEs reaches a predetermined number, but more preferably, when the evaluation values $OEV_1$ to $OEV_3$ of the optimal combination patterns are updated in the optimal combination holding units 15-1 to 15-3, the transmission weight matrix W calculated by the combination evaluation units 13-1 to 13-3 can be held for calculation of the evaluation values $OEV_1$ to $OEV_3$. Specifically, each of the optimal combination holding units 15-1 to 15-3 only needs to notify the calculation result sharing unit 14 when the optimal combination pattern is obtained. As a result, for an area for which an optimal combination pattern is obtained, the calculation result sharing unit 14 only needs to hold the transmit weight matrix W calculated by the combination evaluation unit of the area for the evaluation value OEV of the optimal combination pattern.

In addition, in the timing chart of FIG. 5, while the calculation result sharing unit 14 outputs the calculation results of the transmission weight matrix W and the evaluation values $OEV_1$ to $OEV_3$ for the areas A-1 to A-3 to the combination evaluation units 13-1 to 13-3, calculation of the evaluation values $EV_1$ to $EV_3$ in the areas A-1 to A-3 is temporarily stopped, but the calculation of the evaluation values does not necessarily need to be stopped.

For example, output of the calculation results from the calculation result sharing unit 14 to the combination evaluation units 13-1 to 13-3 and calculation of the evaluation values $OEV_1$ to $OEV_3$ by the combination evaluation units 13-1 to 13-3 and the optimal combination holding units 15-1 to 15-N may overlap with each other. In other words, the combination evaluation units 13-1 to 13-3 and the optimal combination holding units 15-1 to 15-N may continue to calculate the evaluation values $OEV_1$ to $OEV_3$, and at the time point when the output of the calculation results from the calculation result sharing unit 14 has been completed, the combination evaluation units 13-1 to 13-3 may update the shared information used in calculating the evaluation values.

In addition, as illustrated in FIG. 5, in a case where processing is performed cyclically, the calculation results of the transmission weight matrix W and the evaluation values OEV1 to OEV3 obtained in the past scheduling cycle (e.g., one cycle before) are used to calculate the evaluation values OEV1 to OEV3 in the next scheduling cycle, whereby the evaluation values can be calculated without stopping. When the evaluation values continue to be calculated without stopping, the number of combinations which can be calculated within the scheduling cycle is not reduced even when calculation results are shared.

Furthermore, although in the example described above, an example has been given in which the number of combinations of TPs and UEs for which calculation of the evaluation values EV has been completed is compared to the predetermined number to determine whether or not to hold the transmission weight matrix W and the evaluation value OEV for the optimal combination pattern, the determination method is not limited thereto. For example, a circuit may be provided to monitor the evaluation values OEV of the optimal combination patterns to determine whether or not the evaluation values OEV have converged, and the transmission weight matrix W and the evaluation values OEV may be held at a time point when the evaluation values OEV have converged. Note that a circuit disclosed in, for example, WO 2017/038683 may be used as the circuit for determining whether or not the evaluation values OEV have converged.

In addition, in the example described above, an interval for which the calculation results are held is constant, but the interval of holding need not be necessarily constant. For example, in some cases, the interval of holding is shortened in stages along with the progress of the combination evaluation. In the beginning of search, evaluation values are calculated for a long time for each area to cause the evaluation values to reach a value close to the convergence value earlier. Thereafter, the cycle of sharing the calculation results is shortened. In this way, sharing of calculation results prevents the evaluation values from diverging, thereby ensuring that the convergence value is obtained at a time point when the scheduling cycle expires.

Furthermore, although in the example described above, whether or not to hold the calculation results is determined to determine the calculation results for sharing, the method for determining sharing of calculation results is not limited thereto. For example, the calculation results may always be held and updated to control the update at the timing when the calculation results are shared.

The overall transmission weight matrix calculation unit 16 combines the optimal combination patterns of the respective areas held by the optimal combination holding unit 15-1 to 15-N at a predetermined timing. Based on this combined result, the overall transmission weight matrix calculation unit 16 calculates a transmission weight matrix TW for the entire area including all the TPs at which the scheduling apparatus 1 targets.

Then, the overall transmission weight matrix calculation unit 16 outputs the optimal combination pattern information TOPI (TPID, UEID) of the entire area, the transmission weight matrix TW for the entire area, and an evaluation value TOEV of an optimal combination pattern for the entire area (the evaluation values OEV1 to OEV3 for the areas A-1 to A-3). Within the scheduling cycle, a timing at which the overall transmission weight matrix calculation unit 16 calculates the transmission weight matrix TW is determined in advance. In the example of FIG. 5, the transmission weight matrix TW is calculated at time t5 (second timing).

Note that although in the example described above, an example has been given in which the division control unit 11, the combination evaluation units 13-1 to 13-N, and the overall transmission weight matrix calculation unit 16 each access the channel information holding unit 10 to acquire the channel information DI, the method for acquiring the channel information DI is not limited thereto. For example, a configuration may be adopted in which the channel information DI acquired by the division control unit 11 is passed to the combination evaluation units 13-1 to 13-N in the subsequent stage. In this case, it is possible to reduce memory accesses which the plurality of combination evaluation units 13-1 to 13-N perform to acquire the channel information DI. As a result, a reduction in power can be achieved, and control can be omitted in a case where memory accesses of the combination evaluation units 13-1 to 13-N compete against each other.

Operation of First Embodiment

Figure 6:
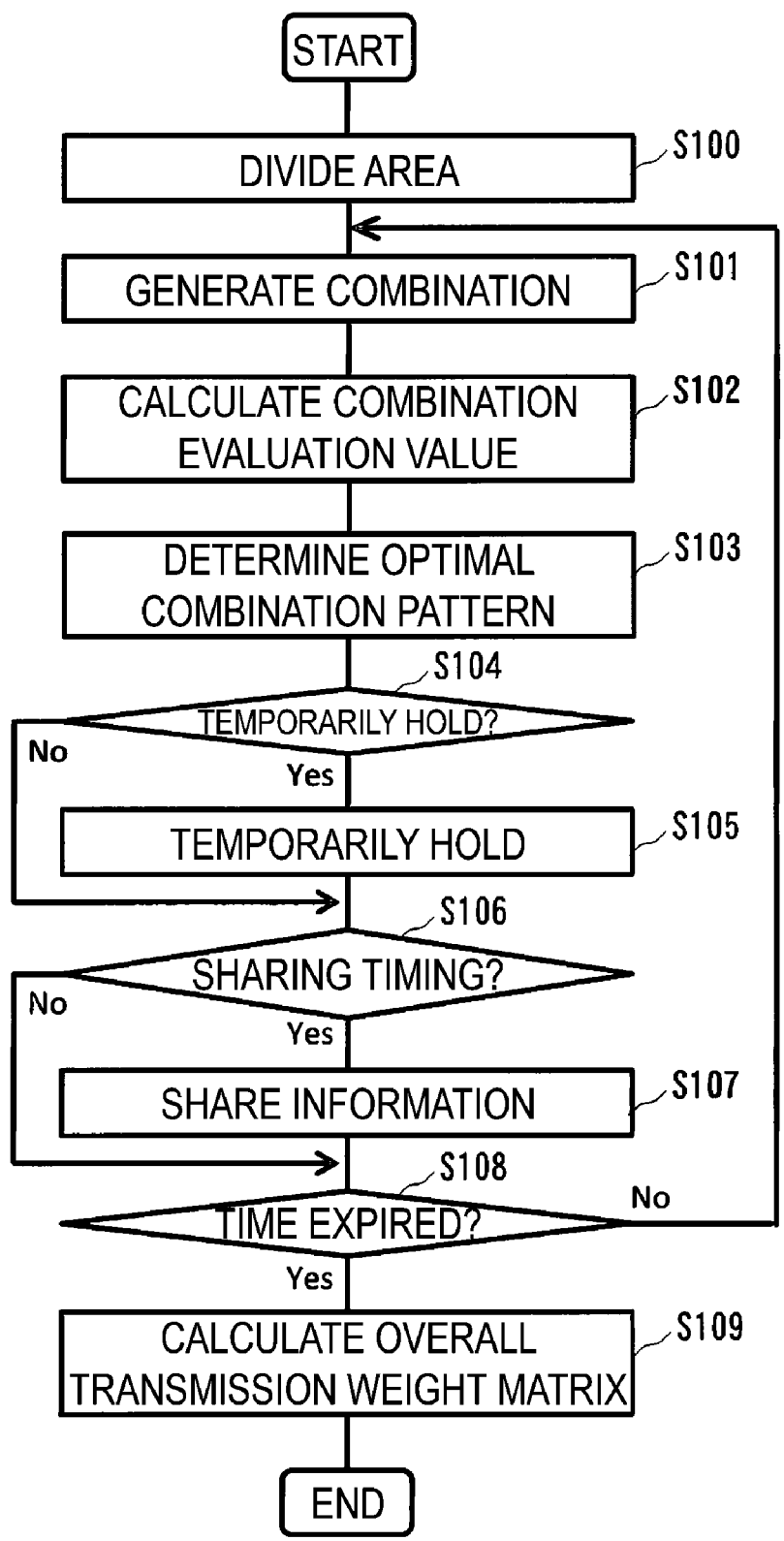
FIG. 6 is a flowchart for explaining an operation of the scheduling apparatus according to the first embodiment of the present invention.

Operation of the scheduling apparatus 1 according to the present embodiment will be next described with reference to FIG. 6. FIG. 6 is a flowchart for explaining the operation of the scheduling apparatus 1.

Division Control Unit 11

First, the division control unit 11 divides an entire communicable area covered by TPs at which the scheduling apparatus 1 targets into a plurality of areas using the channel information DI read from the channel information holding unit 10 (step S100 in FIG. 6). The division control unit 11 outputs combination generation condition information GI (TPID, UEID) including ID of TPs and ID of UEs assigned to the divided areas to the corresponding combination generation units 12-1 to 12-N for each of the areas.

Combination Generation Units 12-1 to 12-N

Next, each of the combination generation units 12-1 to 12-N generates candidate patterns of combinations of TPs and UEs in accordance with a predetermined search algorithm within a range of combinations of TPs and UEs indicated by the combination generation condition information GI (TPID, UEID) for a corresponding one of the areas (step S101 in FIG. 6). Then, each of the combination generation units 12-1 to 12-N outputs the candidate pattern information PI (TPID, UEID) of combinations for each of the areas to a corresponding one of the combination evaluation units 13-1 to 13-N.

Combination Evaluation Units 13-1 to 13-N

Next, based on the candidate pattern information PI (TPID, UEID) output from a corresponding one of the combination generation units 12-1 and the channel information DI acquired from the channel information holding unit 10, each of the combination evaluation units 13-1 to 13-N calculates the evaluation values EVi (i is an integer from 1 to N) of the candidate patterns of combinations of TPs and UEs for a corresponding one of the areas (step S102 in FIG. 6). Furthermore, after the shared information has been obtained from the calculation result sharing unit 14, each of the combination evaluation units 13-1 to 13-N calculates the evaluation values EVi of the candidate patterns of combinations of TPs and UEs for a corresponding one of the area based on the candidate pattern information PI (TPID, UEID), the channel information DI, and the shared information (step S102).

The configuration and operation of the combination evaluation units 13-1 and 13-N are as described above.

Optimal Combination Holding Units 15-1 to 15-N

Next, each of the optimal combination holding units 15-1 to 15-N performs processing in which a candidate pattern of a combination of a TP and a UE for which the evaluation value EVi is maximized is set to the optimal combination pattern, for each of the areas (for each of the combination evaluation units) (step S103 in FIG. 6). Then, each of the optimal combination holding units 15-1 to 15-N holds the optimal combination pattern information OPI (TPID, UEID) and the evaluation value OEVi of the optimal combination pattern.

Calculation Result Sharing Unit 14

Next, the calculation result sharing unit 14 determines whether or not to temporarily hold calculation results such as the transmission weight matrices W calculated by the combination evaluation units 13-1 to 13-N and the evaluation values OEV1 of the optimal combination patterns obtained by the optimal combination holding units 15-1 to 15-N (step S104 in FIG. 6). The calculation result sharing unit 14 holds calculation results of the transmission weight matrix W and the evaluation value OEVi for an area where the number of combinations of TPs and UEs for which calculation of the evaluation values EVi has been completed has reaches a predetermined number (step S105 in FIG. 6).

Then, when the number of combinations of TPs and UEs for which calculation of the evaluation values EVi has been completed has reaches the predetermined number in all the areas (all the combination evaluation units 13-1 to 13-N) (Yes at step S106 in FIG. 6), the calculation result sharing unit 14 outputs the held calculation results to each of the combination evaluation units 13-1 to 13-N (step S107 in FIG. 6).

In this manner, the processing of steps S101 to S107 is repeatedly executed in the scheduling cycle.

Note that, as described above, for an area in which an optimal combination pattern has been obtained, when a transmission weight matrix W calculated by the combination evaluation unit of the area is held in advance in the calculation result sharing unit 14 for the evaluation value OEV of the optimal combination pattern and output to each of the combination evaluation units 13-1 to 13-N at the timing of step S107, a more favorable result is obtained.

Overall Transmission Weight Matrix Calculation Unit 16

Next, when an end timing of the scheduling cycle or a predetermined timing before the scheduling cycle ends comes (Yes at step S108 in FIG. 6), the overall transmission weight matrix calculation unit 16 combines optimal combination patterns of the respective areas held by the optimal combination holding units 15-1 to 15-N to calculate a transmission weight matrix TW of the entire area including all TPs at which the scheduling apparatus 1 targets (step S109 in FIG. 6). Then, the overall transmission weight matrix calculation unit 16 outputs the optimal combination pattern information TOPI (TPID, UEID) for the entire area, the transmission weight matrix TW for the entire area, and the evaluation value TOEV of the optimal combination pattern for the entire area.

Effects of First Embodiment

Figure 15:
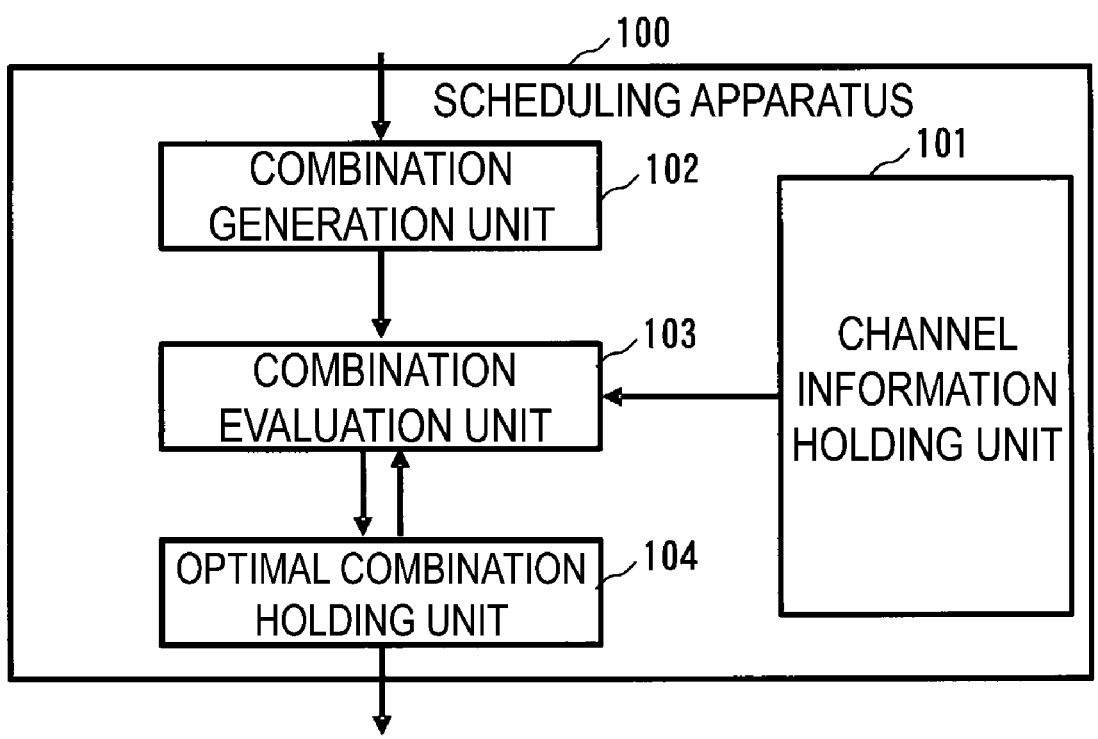
FIG. 15 is a block diagram illustrating a configuration of a scheduling apparatus of the related art.

As described above, in the present embodiment, all TPs at which the scheduling apparatus 1 targets are divided into a plurality of areas, candidate patterns of combinations of TPs and UEs are generated for each of the divided areas, evaluation values EVi of the candidate patterns are calculated for each of the areas to determine an optimal combination pattern for each of the areas, and a transmission weight matrix W and an evaluation value OEVi of the optimal combination pattern for each of the areas are shared by the areas. Then, the optimal combination patterns of the areas are combined to calculate the transmission weight matrix TW for the entire area covered by the scheduling apparatus 1. As a result, in the present embodiment, scheduling in which a plurality of areas are coordinated can be processed, so that it is possible to extend a coordinated range in which wireless transmission is performed between TPs in a coordinated manner compared to the related-art scheduling apparatus illustrated in FIG. 15. In addition, in the present embodiment, the coordinated range can be extended and thus, it is possible to reduce effects of radio wave interference at a boundary between areas, so that improvement in wireless throughput can be expected.

Configuration of Second Embodiment

Figure 7:
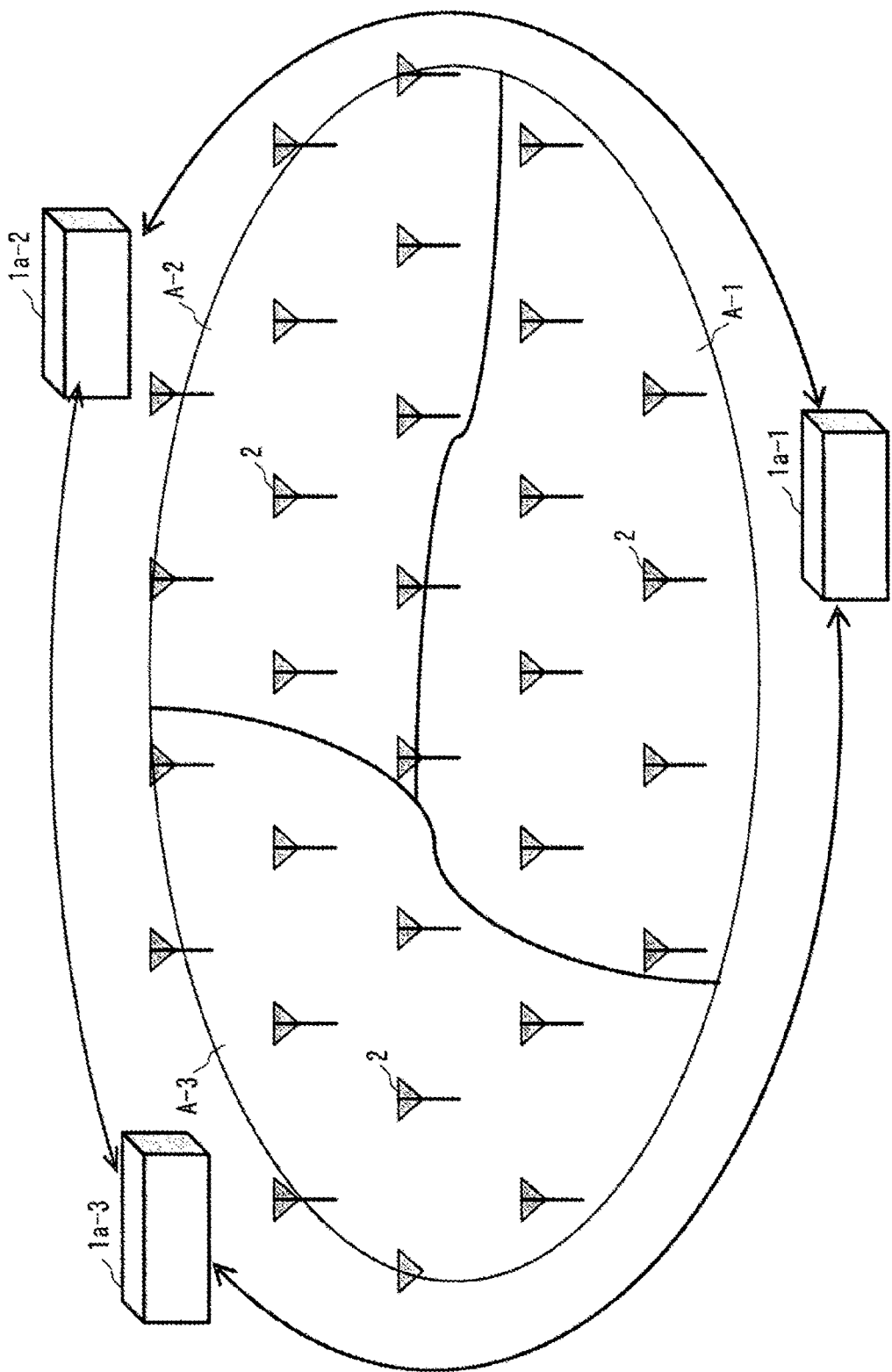
FIG. 7 is a diagram for explaining coordination among scheduling apparatuses according to a second embodiment of the present invention.

Next, a scheduling apparatus according to a second embodiment of the present invention will be described with reference to FIG. 7 to FIG. 12. FIG. 7 is a conceptual diagram for explaining coordination between the scheduling apparatuses according to the second embodiment. In the first embodiment, with one scheduling apparatus, the entire communicable area is divided into a plurality of areas and calculation results are shared in the scheduling apparatus.

In contrast, in the present embodiment, as illustrated in FIG. 7, a plurality of scheduling apparatuses 1*a*-1 to 1*a*-3 work together. Specifically, the plurality of scheduling apparatuses 1*a*-1 to 1*a*-3 are connected to each other by a network and each calculate evaluation values EV and OEV for one different area. For example, in the example illustrated in FIG. 7, the scheduling apparatuses 1*a*-1 to 1*a*-3 calculate evaluation values EV and OEV for areas A-1 to A-3, respectively.

Figure 8:
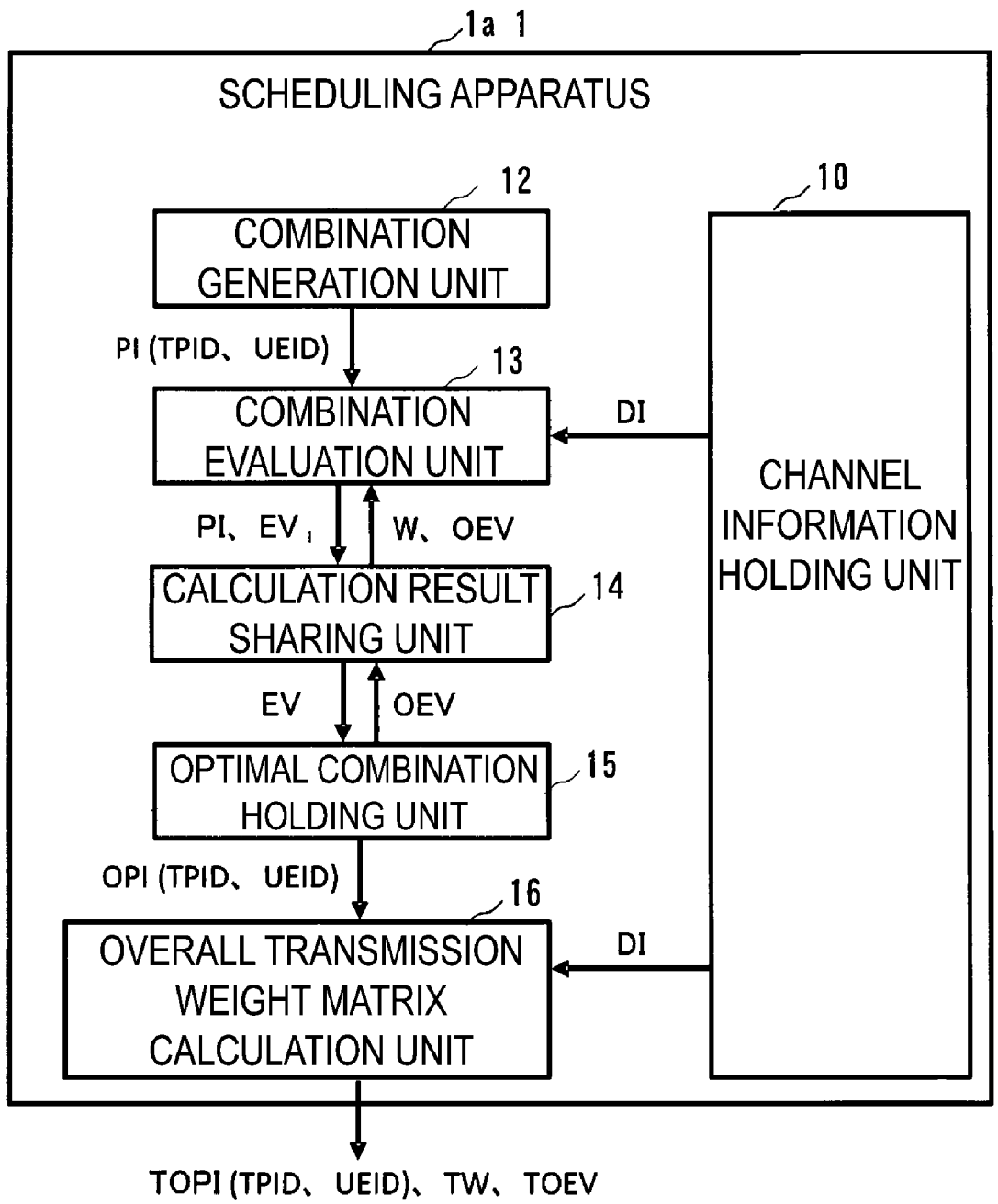
FIG. 8 is a block diagram illustrating a configuration of a scheduling apparatus according to the second embodiment of the present invention.
Figure 9:
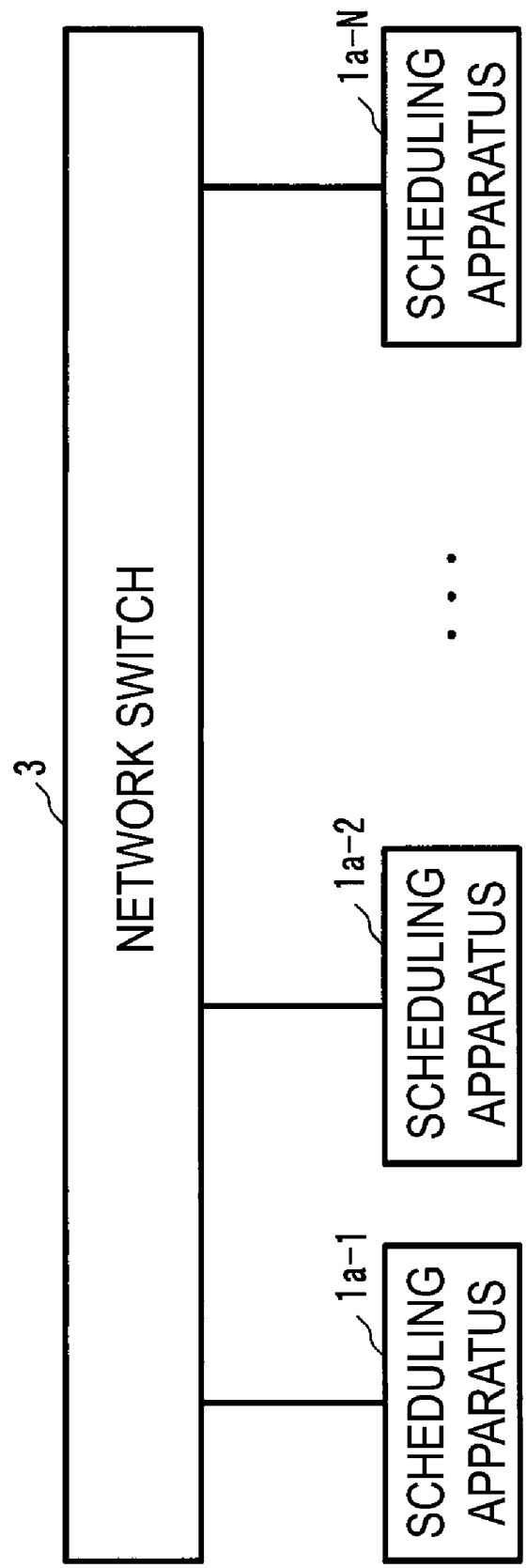
FIG. 9 is a diagram for explaining connection among the scheduling apparatuses according to the second embodiment of the present invention.
Figure 10:
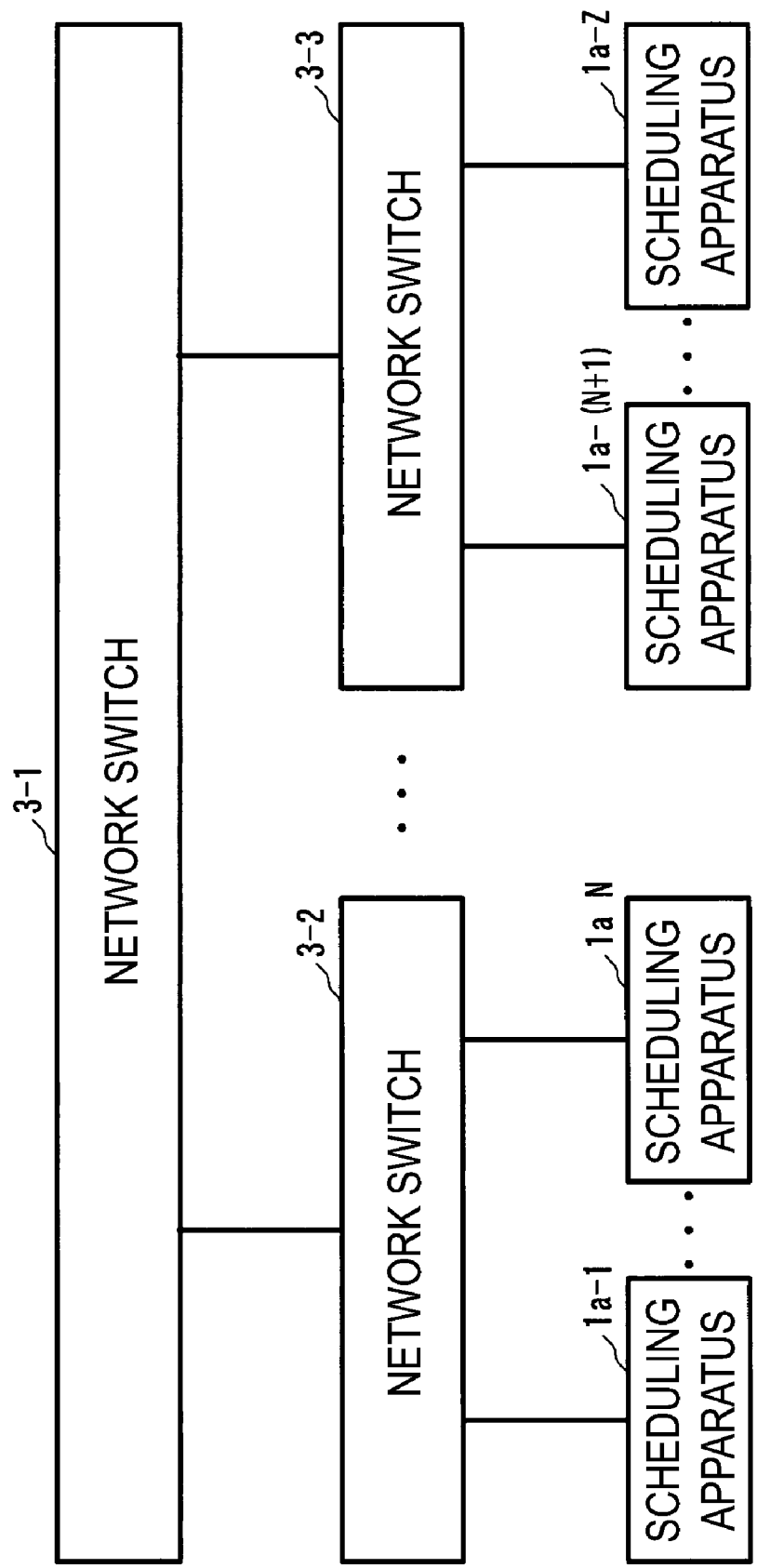
FIG. 10 is a diagram for explaining connection among the scheduling apparatuses according to the second embodiment of the present invention.
Figure 11:
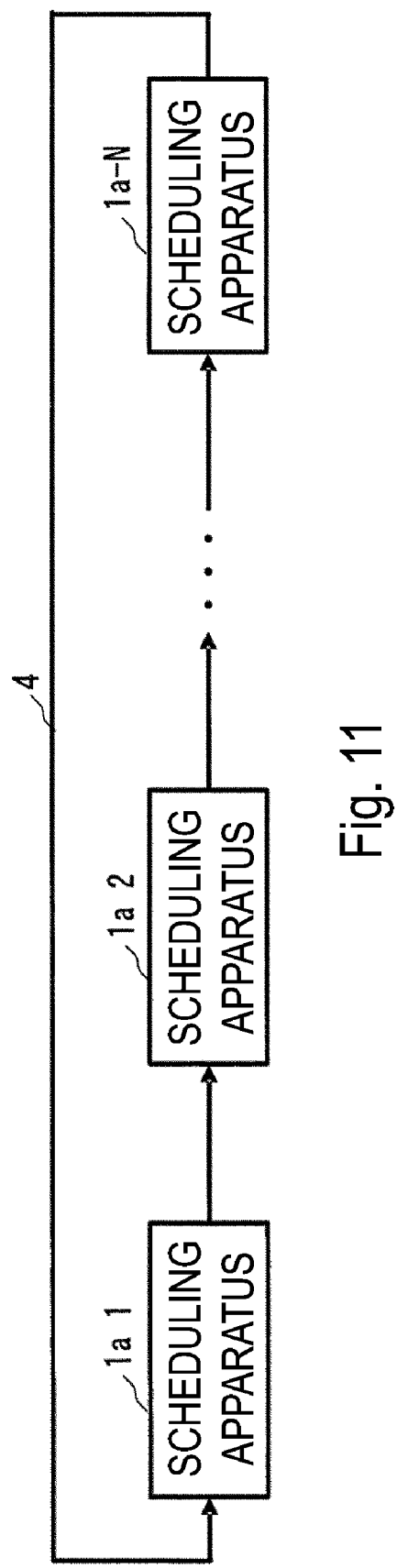
FIG. 11 is a diagram for explaining connection among the scheduling apparatuses according to the second embodiment of the present invention.

FIG. 8 is a block diagram illustrating a configuration of the scheduling apparatus 1*a*-1. The scheduling apparatus 1*a*-1 includes a combination generation unit 12, a combination evaluation unit 13, a calculation result sharing unit 14, an optimal combination holding unit 15, and an overall transmission weight matrix calculation unit 16. The configuration of the other scheduling apparatuses is the same as that of the scheduling apparatus 1*a*-1.

The combination generation unit 12 of each of the scheduling apparatuses 1*a*-1 to 1*a*-3 generates candidate patterns of combinations of TPs and UEs for a corresponding one of the areas A-1 to A-3.

The combined evaluation units 13 of the scheduling apparatuses 1*a*-1 to 1*a*-3 calculate evaluation values EV1 to EV3 of candidate patterns of TPs and UEs for the corresponding areas A-1 to A-3, respectively, based on candidate pattern information PI output from the combination generation units 12 and the channel information DI acquired from the channel information holding unit 10 of the own apparatuses.

The calculation result sharing unit 14 of the scheduling apparatus 1*a*-1 transmits, at a time point at which the number of combinations of TPs and UEs for which calculation of the evaluation values EVi has been completed reaches a predetermined number (first timing), calculation results of a transmission weight matrix W obtained by the combination evaluation unit 13 and an evaluation value OEV1 of the optimal combination pattern obtained by the optimal combination holding unit 15 of the scheduling apparatus 1*a*-1 to the other scheduling apparatuses 1*a*-2 to 1*a*-3. The calculation result sharing unit 14 of the scheduling apparatus 1*a*-2 transmits, at a time point at which the number of combinations of TPs and UEs for which calculation of the evaluation values EV2 has been completed reaches a predetermined number (first timing), calculation results of a transmission weight matrix W obtained by the combination evaluation unit 13 and an evaluation value OEV2 of the optimal combination pattern obtained by the optimal combination holding unit 15 of the scheduling apparatus 1a-2 to the other scheduling apparatuses 1a-1 and 1a-3. The calculation result sharing unit 14 of the scheduling apparatus 1a-3 transmits, at a time point at which the number of combinations of TPs and UEs for which calculation of the evaluation values $EV_3$ has been completed reaches a predetermined number (first timing), calculation results of a transmission weight matrix W obtained by the combination evaluation unit 13 and an evaluation value OEV3 of the optimal combination pattern obtained by the optimal combination holding unit 15 of the scheduling apparatus 1a-3 to the other scheduling apparatuses 1a-1 and 1a-2. In this way, inter-apparatus sharing of the calculation results of the transmission weight matrix W and the evaluation values OEV1 to OEV3 for the areas A-1 to A-3 is completed.

After the sharing of the calculation results has been completed, the combination evaluation unit 13 of the scheduling apparatus 1a-1 calculates an evaluation value EVi for the area A-1 using the shared information (transmission weight matrix W and evaluation values OEV1 to OEV3) obtained by sharing of the calculation results. The same applies to the combination evaluation units 13 of the other scheduling apparatuses 1a-2 and 1a-3.

At a predetermined second timing, the calculation result sharing units 14 of the scheduling apparatuses 1a-2 and 1a-3 transmit the optimal combination pattern information OPI obtained by the optimal combination holding unit 15 of the own apparatuses and the evaluation values OEV1 and OEV2 of the optimal combination patterns as second shared information to the scheduling apparatus 1a-1 which is representative.

The overall transmission weight matrix calculation unit 16 of the scheduling apparatus 1a-1 combines the optimal combination pattern held by the optimal combination holding unit 15 of the scheduling apparatus 1a-1 and the optimal combination patterns indicated by the optimal combination pattern information TOPI transmitted from the scheduling apparatuses 1a-a and 1a-3. Based on this combined result, the overall transmission weight matrix calculation unit 16 of the scheduling apparatus 1a-1 calculates the transmission weight matrix TW of the entire area to be covered by the scheduling apparatuses 1a-1 to 1a-3.

As a configuration of connecting the plurality of scheduling apparatuses 1a, there is a configuration of connection via a network switch such as an Ethernet (trade name) or an InfiniBand. For example, in an example illustrated in FIG. 9, a plurality of scheduling apparatuses 1a-1 to 1a-N are connected via a network switch 3.

Alternatively, as another configuration of connecting a plurality of scheduling apparatuses 1a, there is a configuration of hierarchical connection using a plurality of network switches. For example, in an example illustrated in FIG. 10, a plurality of scheduling apparatuses 1a-1 to 1a-N and 1a-(N+1) to 1a-Z are connected via network switches 3-1 to 3-3. According to the configuration of FIG. 10, it is possible to further extend a coordinated range in which TPs are coordinated with each other to perform wireless transmission.

Furthermore, another configuration of connecting a plurality of scheduling apparatuses 1a, there is a configuration of connection via a ring network. For example, in an example illustrated in FIG. 1i, a plurality of scheduling apparatuses 1a-1 to 1a-N are connected via a ring network 4.

Figure 12:
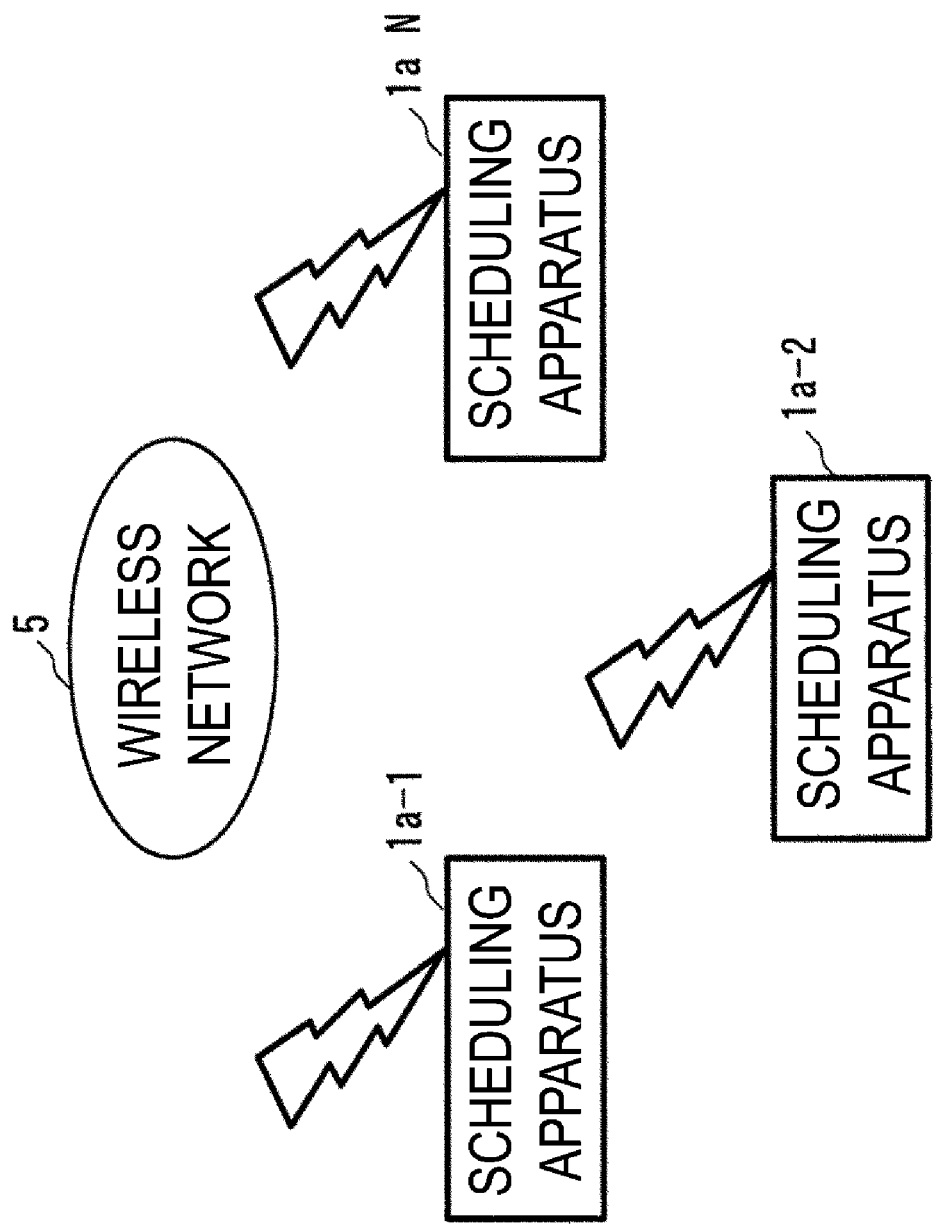
FIG. 12 is a diagram for explaining connection among the scheduling apparatuses according to the second embodiment of the present invention.

Alternatively, as another configuration of connecting a plurality of scheduling apparatuses 1a, for example, as illustrated in FIG. 12, there is a configuration of connecting a plurality of scheduling apparatuses 1a-1 to 1a-N by a wireless network 5.

Note that all the scheduling apparatuses need not necessarily share all the calculation results. For example, a shared range of calculation results may be selectively determined, such that calculation results are shared only in a range having strong radio wave interference.

Furthermore, the range in which calculation results are shared need not necessarily be statically set by initial setting or the like, and may be dynamically changed depending on a time of day, an amount of communication traffic, weather conditions, and the like.

Effects of Second Embodiment

As described above, in the present embodiment, the plurality of scheduling apparatuses 1 are connected by a network, and evaluation values for different areas are calculated, and the calculation results are shared via the network. As a result, the calculation results can be shared between the scheduling apparatuses 1, and the calculation results can be shared in a larger range than in the first embodiment.

Configuration of Third Embodiment

Figure 13:
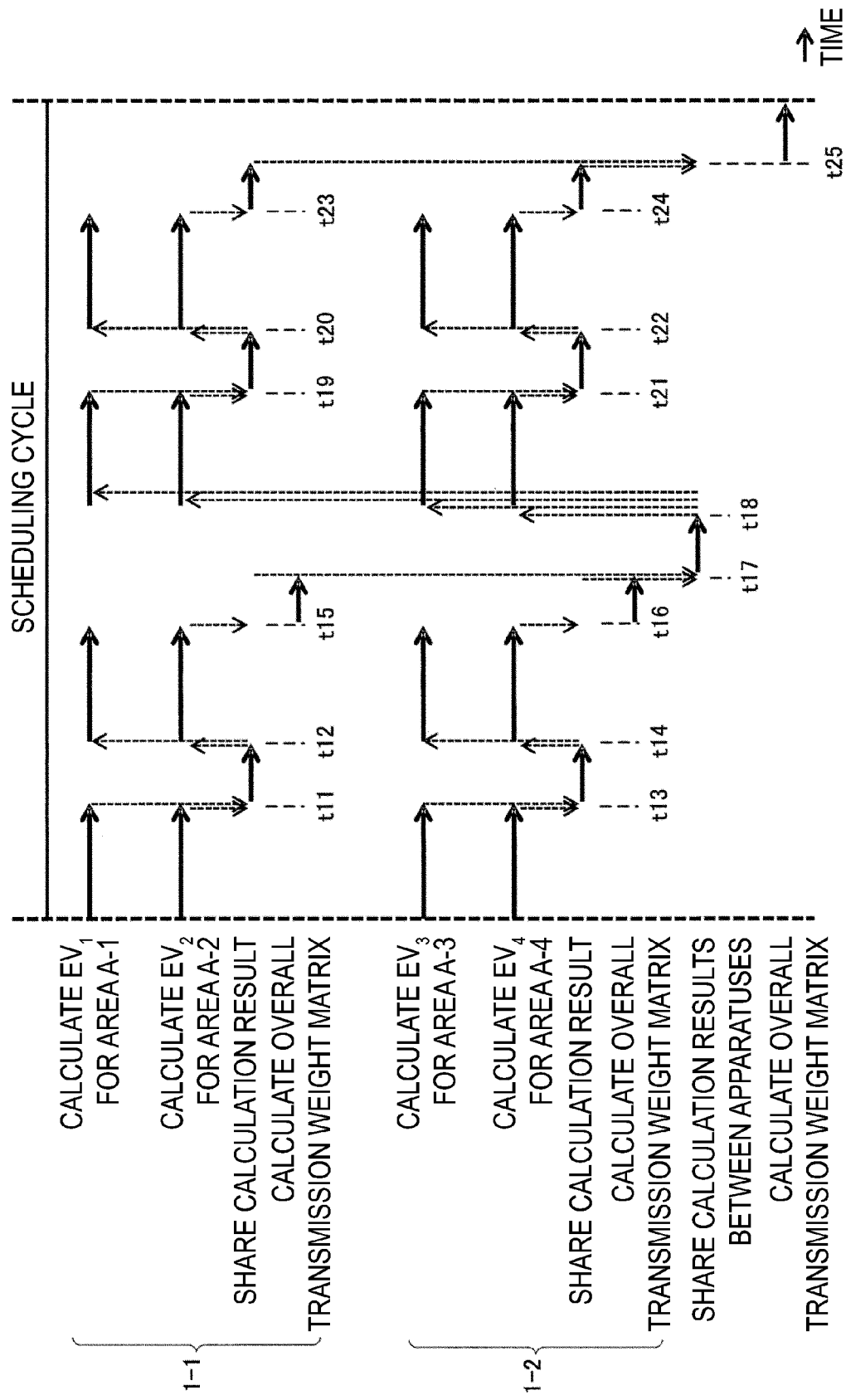
FIG. 13 is a timing chart for explaining a timing of sharing calculation results in scheduling apparatuses according to a third embodiment of the present invention.

Next, a scheduling apparatus according to a third embodiment of the present invention will be described with reference to FIG. 13. FIG. 13 is a chart for explaining a calculation result sharing timing in the scheduling apparatuses according to the third embodiment. The difference from the first embodiment is that calculation results are shared among a plurality of scheduling apparatuses. The difference from the second embodiment is that calculation results are shared hierarchically. Specifically, a timing of sharing calculation results in the scheduling apparatus and a timing of sharing calculation results among the scheduling apparatuses are implemented separately. In the present embodiment as well, the configuration of the scheduling apparatus is the same as that of the first embodiment, and thus an operation will be described using the reference signs in FIG. 1.

Similarly to the first embodiment, the scheduling apparatuses 1-1 and 1-2 each divide an entire communicable area covered by TPs at which are targeted into a plurality of areas (two areas in the present embodiment).

Combination evaluation units 13-1 to 13-2 of the scheduling apparatus 1-1 calculate evaluation values EV1 and EV2 of candidate patterns of combinations of TPs and UEs for corresponding areas A-1 and A-2, respectively. Combination evaluation units 13-1 to 13-2 of the scheduling apparatus 1-2 calculate evaluation values EV1 and EV2 of candidate patterns of combinations of TPs and UEs for corresponding areas A-3 and A-4, respectively.

A calculation result sharing unit 14 of the scheduling apparatus 1-1 outputs the calculation results of a transmission weight matrix W obtained by the combination evaluation units 13-1 and 13-2 and evaluation values OEV1 and OEV2 of optimal combination patterns obtained by optimal combination holding units 15-1 and 15-2 to the combination evaluation units 13-1 and 13-2 at a time point of time t11 when the number of combinations of TPs and UEs for which the evaluation values EVi and EV2 has been completed reaches a predetermined number. Thus, sharing of the calculation results of the transmission weight matrix W and the evaluation values OEV1 and OEV2 for the areas A-1 and A-2 is completed at time t12. After completion of the sharing of the calculation results, the combination evaluation units 13-1 and 13-2 of the scheduling apparatus 1-1 use shared information (transmission weight matrix W and evaluation values OEV1, OEV2) obtained by the sharing of the calculation results to calculate evaluation values EVi and EV2 for the areas A-1 and A-2.

On the other hand, the calculation result sharing unit 14 of the scheduling apparatus 1-2 outputs the calculation results of a transmission weight matrix W obtained by the combination evaluation units 13-1 and 13-2 and evaluation values OEV3 and OEV4 of optimal combination patterns obtained by the optimal combination holding units 15-1 and 15-2 to the combination evaluation units 13-1 and 13-2 at a time point of time t13 when the number of combinations of TPs and UEs for which calculation of the evaluation values $EV_3$ and $EV_4$ has been completed reaches a predetermined number. Thus, sharing of the calculation results of the transmission weight matrix W and the evaluation values OEV3 and OEV4 for the areas A-3 and A-4 is completed at time t14. After completion of the sharing of the calculation results, the combination evaluation units 13-1 and 13-2 of the scheduling apparatus 1-2 use shared information (transmission weight matrix W and evaluation values OEV3, OEV4) obtained by the sharing of the calculation results to calculate evaluation values EV3 and EV4 for the areas A-3 and A-4.

The overall transmission weight matrix calculation unit 16 of the scheduling apparatus 1-1 combines the optimal combination patterns of the areas A-1 and A-2 held by the optimal combination holding units 15-1 and 15-2 of the scheduling apparatus 1-1 at a predetermined timing (time t15 in FIG. 13). Based on this combined result, the overall transmission weight matrix calculation unit 16 of the scheduling apparatus 1-1 calculates a transmission weight matrix TW of the entire area having the areas A-1 and A-2 in combination. The overall transmission weight matrix calculation unit 16 of the scheduling apparatus 1-2 combines the optimal combination patterns of the areas A-3 and A-4 held by the optimal combination holding units 15-1 and 15-2 of the scheduling apparatus 1-2 at a predetermined timing (time t16 in FIG. 13). Based on this combined result, the overall transmission weight matrix calculation unit 16 of the scheduling apparatus 1-2 calculates a transmission weight matrix TW of the entire area having the areas A-3 and A-4 in combination.

At time t17 (third timing), the calculation result sharing unit 14 of the scheduling apparatus 1-1 transmits calculation results of the transmission weight matrix W obtained by the combination evaluation units 13-1 and 13-2 and the evaluation values OEV1 and OEV2 of the optimal combination patterns obtained by the optimal combination holding units 15-1 and 15-2 of the scheduling apparatus 1-1 (second shared information) to the scheduling apparatus 1-2. On the other hand, the calculation result sharing unit 14 of the scheduling apparatus 1-2 transmits calculation results of the transmission weight matrix W obtained by the combination evaluation units 13-1 and 13-2 and the evaluation values OEV3 and OEV4 of the optimal combination patterns obtained by the optimal combination holding units 15-1 and 15-2 of the scheduling apparatus 1-2 (second shared information) to the scheduling apparatus 1-1. Thus, inter-apparatus sharing of the calculation results of the transmission weight matrix W and the evaluation values OEV1 to OEV4 for the areas A-1 to A-4 is completed at time t18.

After completion of the sharing of the calculation results, the combination evaluation units 13-1 and 13-2 of the scheduling apparatus 1-1 use shared information (transmission weight matrix W and evaluation values OEV1 to OEV4) obtained by the sharing of the calculation results to calculate evaluation values EV1 and EV2 for the areas A-1 and A-2. The combination evaluation units 13-1 and 13-2 of the scheduling apparatus 1-2 uses the shared information (transmission weight matrix W and evaluation values OEV1 to OEV4) obtained by the sharing of the calculation results to calculate evaluation values EV3 and EV4 for the areas A-3 and A-4.

The operation from time t19 to time t24 is the same as that from time t11 to time t16. At time t25 (fourth timing), the calculation result sharing unit 14 of the scheduling apparatus 1-1 transmits optimal combination pattern information TOPI for the entire area having the areas A-1 and A-2 in combination, a transmission weight matrix TW for the entire area, and an evaluation value TOEV of an optimal combination pattern for the entire area (evaluation values OEV1 and OEV2 for the areas A-1 and A-2) as third shared information to the scheduling apparatus 1-2. The overall transmission weight matrix calculation unit 16 of the scheduling apparatus 1-2 combines the optimal combination patterns held by the optimal combination holding units 15-1 to 15-N of the scheduling apparatus 1-2 and an optimal combination pattern indicated by the optimal combination pattern information TOPI transmitted from the scheduling apparatus 1-1. Based on this combined result, the overall transmission weight matrix calculation unit 16 of the scheduling apparatus 1-2 calculates a transmission weight matrix TW of the entire area at which the scheduling apparatuses 1-1 and 1-2 target.

As a connection configuration of the scheduling apparatus 1-1 and the scheduling apparatus 1-2, the connection configuration of the second embodiment described in FIG. 9 to FIG. 12 is exemplified.

Effects of Third Embodiment

As described above, in the present embodiment, sharing of calculation results in a scheduling apparatus and sharing of calculation results between scheduling apparatuses are performed separately. In the second embodiment, a delay due to communication over a network occurs every time calculation results are shared. In contrast, in the present embodiment, sharing of calculation results is performed not only between scheduling apparatuses over a network, but also in a scheduling apparatus, which makes it possible to reduce the effect of delay due to communication over the network.

Extension of Embodiments

Embodiments of the present invention have been described above with reference to the embodiments, but the present invention is not limited to the above-described embodiments. Various changes understood by a person skilled in the art within the scope of the present invention can be made to the configurations and details of the present invention. Furthermore, the embodiments can be freely combined within a range where no inconsistency occurs.

Figure 14:
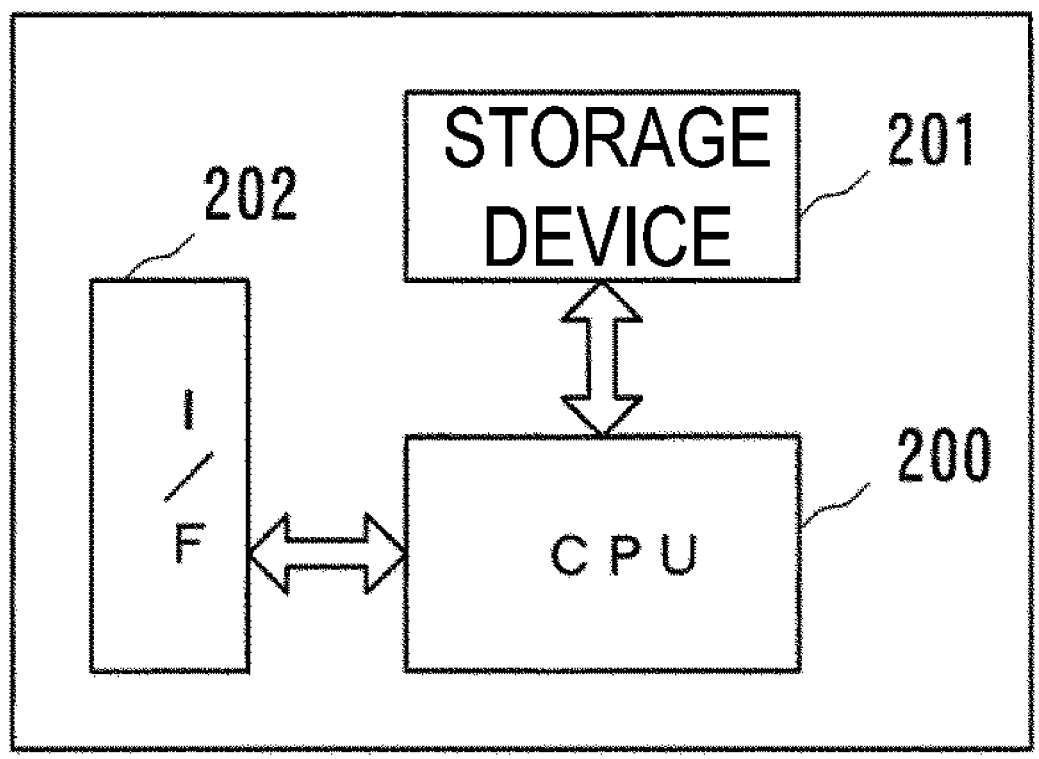
FIG. 14 is a block diagram illustrating a configuration example of a computer that realizes each of the scheduling apparatuses according to the first to third embodiments of the present invention.

Each of the scheduling apparatuses 1 and 1*a* described in the first to third embodiments can be realized by a computer including a central processing unit (CPU), a storage device, and an interface, and programs for controlling these hardware resources. A configuration example of this computer is illustrated in FIG. 14. The computer includes a CPU 200, a storage device 201, and an interface device (hereinafter abbreviated as I/F) 202. A communication network or the like is connected to the I/F 202. In such a computer, a scheduling program for realizing the scheduling method of embodiments of the present invention is provided in a state of being recorded in a recording medium such as a flexible disk, a CD-ROM, a DVD-ROM, or a memory card and stored in the storage device 201. The scheduling program may also be provided through a network. The CPU 200 of each of the scheduling apparatuses 1 and 1*a* executes the processing described in the first to third embodiments in accordance with the program stored in the storage device 201.

The scheduling apparatuses 1 and 1*a* each may be realized by using a large scale integration (LSI) circuit formed into a field-programmable gate array (FPGA) or an application specific integrated circuit (ASIC).

INDUSTRIAL APPLICABILITY

The present invention can be applied to technologies for assigning radio resources to combination patterns of transmission points and user terminals.

REFERENCE SIGNS LIST

1, 1*a* Scheduling apparatus
2 Transmission point
3 Network switch
4 Network
5 Wireless network
10 Channel information holding unit
11 Division control unit
12-1 to 12-N Combination generation unit
13-1 to 13-N Combination evaluation unit
14 Calculation result sharing unit
15-1 to 15-N Optimal combination holding unit 15-1 to 15-N
16 Overall transmission weight matrix calculation unit
130 Transmission weight matrix calculation unit
131-1 to 131-M Evaluation value calculation unit
132 Overall evaluation value calculation unit.

The invention claimed is:

1. A scheduling apparatus comprising:
a division controller configured to divide a communicable area covered by a plurality of transmission points into a plurality of areas;
a combination generation device configured to generate candidate patterns of combinations of transmission points of the plurality of transmission points and user terminals for each of the plurality of areas;
a combination evaluation device configured to calculate evaluation values of the candidate patterns for each of the plurality of areas based on channel information representing radio wave states between the transmission points and the user terminals;
an optimal combination holding device configured to hold a pattern having a highest evaluation value among the candidate patterns as an optimal combination pattern in assigning a radio resource for each of the plurality of areas;
a calculation result sharing device configured to output an evaluation value of a respective optimal combination pattern held for each of the plurality of areas by the optimal combination holding device to the combination evaluation device for sharing with the plurality of areas as first shared information when a first timing occurs; and
an overall transmission weight matrix calculation device configured to calculate a transmission weight matrix for the communicable area based on a result obtained by combining the optimal combination patterns of the plurality of areas when a second timing after the first timing occurs, wherein after the first timing, the combination evaluation device uses the first shared information along with the channel information to calculate an evaluation value of a respective candidate pattern for each of the plurality of areas.

2. The scheduling apparatus according to claim 1, wherein:
the combination evaluation device comprises:
a transmission weight matrix calculation device configured to calculate a transmission weight matrix for each of the plurality of areas based on the channel information;
an evaluation value calculation device configured to calculate an evaluation value of the candidate pattern for each of the candidate patterns and for each of the plurality of areas based on the transmission weight matrix calculated by the transmission weight matrix calculation device; and
an overall evaluation value calculation device configured to calculate a sum of evaluation values calculated by the evaluation value calculation device for each of the plurality of areas;
the calculation result sharing device is configured to output a transmission weight matrix calculated by the transmission weight matrix calculation device of the combination evaluation device along with an evaluation value of an optimal combination pattern held by the optimal combination holding device to the combination evaluation device for sharing with the plurality of areas as the first shared information when the first timing occurs; and
the transmission weight matrix calculation device of the combination evaluation device is configured to use the first shared information along with the channel information to calculate the transmission weight matrix after the first timing.

3. The scheduling apparatus according to claim 1, wherein the calculation result sharing device is configured to output the first shared information to the combination evaluation device at a time, as the first timing, when a quantity of combinations of transmission points and user terminals for which calculation of a respective evaluation value for each of the plurality of areas has been completed reaches a predetermined number.

4. The scheduling apparatus according to claim 1, wherein:
the calculation result sharing device is configured to:
transmits an evaluation value of an optimal combination pattern held by the optimal combination holding device as second shared information to a second scheduling apparatus covering a second communicable area different from a first communicable area covered by the scheduling apparatus when a third timing after the second timing occurs; and transmits a result obtained by combining the optimal combination patterns of the plurality of areas as third shared information to the second scheduling apparatus when a predetermined fourth timing after the third timing occurs;

after the third timing, the combination evaluation device uses the first shared information and the second shared information along with the channel information to calculate an evaluation value of the respective candidate pattern for each of the plurality of areas; and the overall transmission weight matrix calculation device is configured to calculate a transmission weight matrix of an area comprising the first communicable area and the second communicable area in combination based on a result obtained by combining an optimal combination pattern held by the optimal combination holding device and an optimal combination pattern obtained by the third shared information transmitted from the second scheduling apparatus.

5. A scheduling apparatus comprising:

a combination generation device configured to generate candidate patterns of combinations of transmission points and user terminals;

a combination evaluation device configured to calculate evaluation values of the candidate patterns based on channel information representing radio wave states between the transmission points and the user terminals;

an optimal combination holding device configured to hold a pattern having the highest evaluation value among the candidate patterns as an optimal combination pattern in assigning a radio resource;

a calculation result sharing device configured to transmit an evaluation value of an optimal combination pattern held by the optimal combination holding device to a second scheduling apparatus covering a second communicable area different from a first communicable area covered by the scheduling apparatus for sharing with the second scheduling apparatus as first shared information when a first timing occurs and transmit an optimal combination pattern held by the optimal combination holding device as second shared information to the second scheduling apparatus when a predetermined second timing after the first timing occurs; and an overall transmission weight matrix calculation device configured to calculate a transmission weight matrix of an overall area comprising the first communicable area and the second communicable area based on a result obtained by combining an optimal combination pattern held by the optimal combination holding device and an optimal combination pattern obtained by the second shared information transmitted by the second scheduling apparatus, wherein after the first timing, the combination evaluation device is configured to use the first shared information along with the channel information to calculate an evaluation value of the candidate pattern.

6. A scheduling method comprising:

dividing an entire communicable area covered by a plurality of transmission points into a plurality of areas;

generating candidate patterns of combinations of transmission points of the plurality of transmission points and user terminals for each of the plurality of areas;

calculating evaluation values of the candidate patterns for each of the plurality of areas based on channel information representing radio wave states between the transmission points and the user terminals;

holding a pattern having the highest evaluation value as an optimal combination pattern in assigning a radio resource among the candidate patterns for each of the plurality of areas;

outputting evaluation values of the optimal combination patterns of the divided areas for sharing with the plurality of areas as shared information when a first timing occurs; and calculating a transmission weight matrix of an entire area including the plurality of transmission points based on a result of combining the optimal combination patterns of the plurality of areas when a predetermined second timing after the first timing occurs, wherein after the first timing, calculating of the evaluation values of the candidate patterns comprises using the shared information along with the channel information to calculate an evaluation value of a respective candidate pattern for each of the plurality of areas.

* * * * *